US011860945B2

(12) United States Patent
Mohri

(10) Patent No.: US 11,860,945 B2
(45) Date of Patent: Jan. 2, 2024

(54) INFORMATION PROCESSING APPARATUS TO OUTPUT ANSWER INFORMATION IN RESPONSE TO INQUIRY INFORMATION

(71) Applicant: Ricoh Company, Ltd., Tokyo (JP)

(72) Inventor: Takanori Mohri, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 31 days.

(21) Appl. No.: 17/392,407

(22) Filed: Aug. 3, 2021

(65) Prior Publication Data

US 2021/0365501 A1 Nov. 25, 2021

Related U.S. Application Data

(62) Division of application No. 16/513,955, filed on Jul. 17, 2019, now Pat. No. 11,113,336.

(30) Foreign Application Priority Data

Jul. 20, 2018 (JP) .................................. 2018-137006

(51) Int. Cl.
G06F 16/9032 (2019.01)
H04L 51/02 (2022.01)
(Continued)

(52) U.S. Cl.
CPC .... *G06F 16/90332* (2019.01); *G06F 16/3329* (2019.01); *G06F 16/3344* (2019.01);
(Continued)

(58) Field of Classification Search
CPC ............ G06F 16/3329; G06F 16/3344; G06F 16/90332; G06F 16/90344; G06F 40/205; G06F 40/268; G10L 15/22; H04L 51/02
See application file for complete search history.

(56) References Cited

U.S. PATENT DOCUMENTS 5,333,317 A    7/1994  Dann
6,028,601 A *  2/2000  Machiraju ............... G06F 40/30
                                              707/999.005
(Continued)

FOREIGN PATENT DOCUMENTS

JP    2003-058464 A    2/2003
JP    2005-084739      3/2005
(Continued)

OTHER PUBLICATIONS

Office Action dated Apr. 19, 2022, in corresponding Japanese patent Application No. 2018-137006, 2 pages.

*Primary Examiner* — Eric Yen
(74) *Attorney, Agent, or Firm* — XSENSUS LLP

(57) ABSTRACT

An information processing apparatus outputs answer information corresponding to inquiry information that is input. The information processing apparatus includes a memory and circuitry. The memory is configured to store a plurality of databases each having at least a first field and a second field. The circuitry is configured to: perform morphological analysis on the inquiry information, to divide the inquiry information into morphemes; perform a first matching process based on the morphemes and the first field of each of the plurality of databases, to determine whether to adopt the database as an extraction source from which the answer information is to be extracted; and perform a second matching process based on the morphemes and the first field of the database, which is determined to be adopted as the extraction source, to output, as the answer information, data in the second field corresponding to data in the first field.

17 Claims, 24 Drawing Sheets

(51) Int. Cl.
  *G06F 40/268* (2020.01)
  *G06F 16/903* (2019.01)
  *G06F 40/205* (2020.01)
  *G06F 16/332* (2019.01)
  *G06F 16/33* (2019.01)
  *G10L 15/22* (2006.01)

(52) U.S. Cl.
  CPC ...... *G06F 16/90344* (2019.01); *G06F 40/205* (2020.01); *G06F 40/268* (2020.01); *G10L 15/22* (2013.01); *H04L 51/02* (2013.01)

(56) References Cited

U.S. PATENT DOCUMENTS

| | | | |
|---|---|---|---|
| 6,377,944 B1* | 4/2002 | Busey | H04L 9/40 |
| 6,526,404 B1* | 2/2003 | Slater | G06F 16/9535 |
| | | | 707/999.005 |
| 8,918,468 B1* | 12/2014 | Fisher | G06F 16/3344 |
| | | | 709/224 |
| 9,961,200 B1* | 5/2018 | Kothuvatiparambil | |
| | | | G10L 15/1822 |
| 10,019,513 B1 | 7/2018 | Koren | |
| 2004/0162724 A1* | 8/2004 | Hill | G10L 15/1822 |
| | | | 704/231 |
| 2004/0167875 A1 | 8/2004 | Sneiders | |
| 2004/0193691 A1* | 9/2004 | Chang | H04L 63/08 |
| | | | 709/206 |
| 2004/0267734 A1* | 12/2004 | Toshima | G06V 30/418 |
| 2006/0206472 A1* | 9/2006 | Masuichi | G06F 16/9535 |
| 2008/0126092 A1* | 5/2008 | Kawazoe | H04N 21/4394 |
| | | | 704/E15.04 |
| 2009/0063959 A1 | 3/2009 | Stejic | |
| 2009/0162824 A1* | 6/2009 | Heck | G06Q 10/10 |
| | | | 434/362 |
| 2011/0033114 A1* | 2/2011 | Konno | G06V 30/268 |
| | | | 382/190 |
| 2011/0153668 A1* | 6/2011 | Walker | G06F 16/25 |
| | | | 707/E17.107 |
| 2012/0165618 A1* | 6/2012 | Algoo | A61B 5/744 |
| | | | 600/300 |
| 2012/0221544 A1 | 8/2012 | Hu | |
| 2012/0233182 A1 | 9/2012 | Baudel | |
| 2012/0284271 A1* | 11/2012 | Kuroiwa | G06F 40/289 |
| | | | 707/E17.089 |
| 2013/0007037 A1* | 1/2013 | Azzam | G06F 16/3329 |
| | | | 707/769 |
| 2013/0238601 A1 | 9/2013 | Kanemoto et al. | |
| 2013/0304758 A1* | 11/2013 | Gruber | G06F 16/248 |
| | | | 707/769 |
| 2014/0149554 A1 | 5/2014 | Krishna | |
| 2014/0250134 A1* | 9/2014 | Jones | G06F 16/24578 |
| | | | 707/705 |
| 2015/0186553 A1 | 7/2015 | Biehn | |
| 2015/0317321 A1 | 11/2015 | Tang | |
| 2016/0071022 A1* | 3/2016 | Bruno | G06N 20/00 |
| | | | 706/12 |
| 2016/0328469 A1 | 11/2016 | Zhu | |
| 2017/0099249 A1* | 4/2017 | Kozareva | G06N 5/022 |
| 2017/0116224 A1 | 4/2017 | Qi | |
| 2017/0193092 A1* | 7/2017 | Byron | G06F 40/279 |
| 2018/0007206 A1* | 1/2018 | Klein | H04M 3/5166 |
| 2018/0115643 A1* | 4/2018 | Skiba | H04M 3/5175 |
| 2019/0220695 A1* | 7/2019 | Nefedov | G06N 5/022 |
| 2019/0318219 A1* | 10/2019 | Arora | G06N 5/04 |
| 2019/0354630 A1* | 11/2019 | Guo | G10L 15/08 |
| 2020/0329297 A1 | 10/2020 | Dutt | |
| 2020/0382450 A1* | 12/2020 | Vaughn | H04L 51/02 |
| 2022/0129628 A1* | 4/2022 | Giarrusso | G06N 20/00 |
| 2023/0072511 A1* | 3/2023 | Wu | G06F 16/285 |

FOREIGN PATENT DOCUMENTS

| | | |
|---|---|---|
| JP | 2013-117938 | 6/2013 |
| JP | 2013-214294 A | 10/2013 |
| JP | 2015-036945 | 2/2015 |

* cited by examiner

FIG. 4A

391 USER INFORMATION DATABASE

| USER NAME | DEPARTMENT | POST |
|---|---|---|
| ID0001 | SALE DEPARTMENT | NON-MANAGEMENT |
| ID0002 | SALE DEPARTMENT | MANAGER |
| ID0003 | ACCOUNTING DEPARTMENT | SECTION MANAGER |
| ID0004 | DEVELOPMENT DEPARTMENT | DIVISION MANAGER |
| ... | ... | ... |

FIG. 4B

392 ANSWER SOURCE INFORMATION DATABASE

| FAQ DB NAME | ASSOCIATED INFORMATION TAG |
|---|---|
| SALES DEPARTMENT FAQ | ON SALE/RELEASE DATE/LINE-UP/SPECIFICATION |
| ACCOUNTING DEPARTMENT FAQ | NET SALES/AMOUNT/PRICE/ /UNIT/QUANTITY/ LOWEST/PROFIT RATIO |
| PRODUCT MANAGEMENT DEPARTMENT FAQ | COLOR DISPLAY/UNIT/ QUANTITY/ STORAGE LOCATION/INVENTORY |
| PUBLIC RELATIONS DEPARTMENT FAQ | ADVERTISING EXPENDITURE/MEDIA/GROSS PROFIT/ PERIOD |
| ... | ... |

FIG. 5A

393a SALES DEPARTMENT FAQ DATABASE

| CATEGORY | MODEL NAME | SIZE | RESOLUTION | TAG |
|---|---|---|---|---|
| COLOR DISPLAY | DisplayA | 19 INCHES | 1920×1080 | LOW PRICE/ON SALE |
| COLOR DISPLAY | DisplayB | 23 INCHES | 1920×1080 | NEW PRODUCT/MID-RANGE |
| COLOR DISPLAY | DisplayC | 32 INCHES | 4K | LARGE SCREEN/HIGH-SPEC |
| ... | ... | ... | ... | ... |

FIG. 5B

393b ACCOUNTING DEPARTMENT FAQ DATABASE

| CATEGORY | MODEL NAME | SALES PRICE | PROFIT RATIO | TAG |
|---|---|---|---|---|
| COLOR DISPLAY | DisplayA | 100,000 YEN | 10% | LOWEST/OLD MODEL |
| COLOR DISPLAY | DisplayB | 450,000 YEN | 10% | MID-RANGE |
| COLOR DISPLAY | DisplayC | 800,000 YEN | 10% | HIGHEST/HIGHEST PRICE/HIGH-SPEC |
| ... | ... | ... | ... | ... |

FIG. 5C

393c PRODUCT MANAGEMENT DEPARTMENT FAQ DATABASE

| CATEGORY | MODEL NAME | QUANTITY OF INVENTORY | STORAGE LOCATION |
|---|---|---|---|
| COLOR DISPLAY | DisplayA | 20 UNITS | AA WAREHOUSE |
| COLOR DISPLAY | DisplayB | 35 UNITS | BB WAREHOUSE |
| COLOR DISPLAY | DisplayC | 10 UNITS | CC WAREHOUSE |
| ... | ... | ... | ... |

FIG. 5D

393d PUBLIC RELATIONS DEPARTMENT FAQ DATABASE

| CATEGORY | FISCAL YEAR | TAG |
|---|---|---|
| PERFORMANCE | 2018 | GROSS PROFIT 15% INCREASE |
| PRESS RELEASE | 2017 | NEW PRODUCT RELEASE |
| PRESS RELEASE | 2016 | BUSINESS PARTNERSHIP WITH COMPANY X |
| ... | ... | ... |

FIG. 7B

| QUESTION SENTENCE MORPHOLOGICAL ANALYSIS | COLOR DISPLAY LINE-UP LOWEST PRICE |
|---|---|

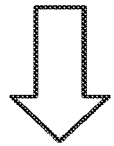
SELECT DB SERVING AS ANSWER SOURCE

392 ANSWER SOURCE INFORMATION DATABASE

| FAQ DB NAME | ASSOCIATED INFORMATION TAG |
|---|---|
| SALES DEPARTMENT FAQ | ON SALE/RELEASE DATE/<u>LINE-UP</u>/SPECIFICATION |
| ACCOUNTING DEPARTMENT FAQ | NET SALES/AMOUNT/<u>PRICE</u>/COST/UNIT/QUANTITY/<u>LOWEST</u>/PROFIT RATIO |
| PRODUCT MANAGEMENT DEPARTMENT FAQ | <u>COLOR DISPLAY</u>/UNIT/ QUANTITY/ STORAGE LOCATION |
| PUBLIC RELATIONS DEPARTMENT FAQ | ADVERTISING EXPENDITURE/MEDIA/GROSS PROFIT/PERIOD |
| ... | ... |

FIG. 8B

| ID0001 | SALES DEPARTMENT, NON-MANAGEMENT |
|---|---|
| QUESTION SENTENCE MORPHOLOGICAL ANALYSIS | COLOR DISPLAY LINE-UP |

SELECT DB SERVING AS ANSWER SOURCE

392 ANSWER SOURCE INFORMATION DATABASE

| FAQ DB NAME | ASSOCIATED INFORMATION TAG |
|---|---|
| SALES DEPARTMENT FAQ | ON SALE/RELEASE DATE/LINE-UP/SPECIFICATION |
| ACCOUNTING DEPARTMENT FAQ | NET SALES/AMOUNT/PRICE/COST/UNIT/QUANTITY/ LOWEST/PROFIT RATIO |
| PRODUCT MANAGEMENT DEPARTMENT FAQ | COLOR DISPLAY/UNIT/ QUANTITY/ STORAGE LOCATION |
| PUBLIC RELATIONS DEPARTMENT FAQ | ADVERTISING EXPENDITURE/MEDIA/GROSS PROFIT/ PERIOD |
| ... | ... |

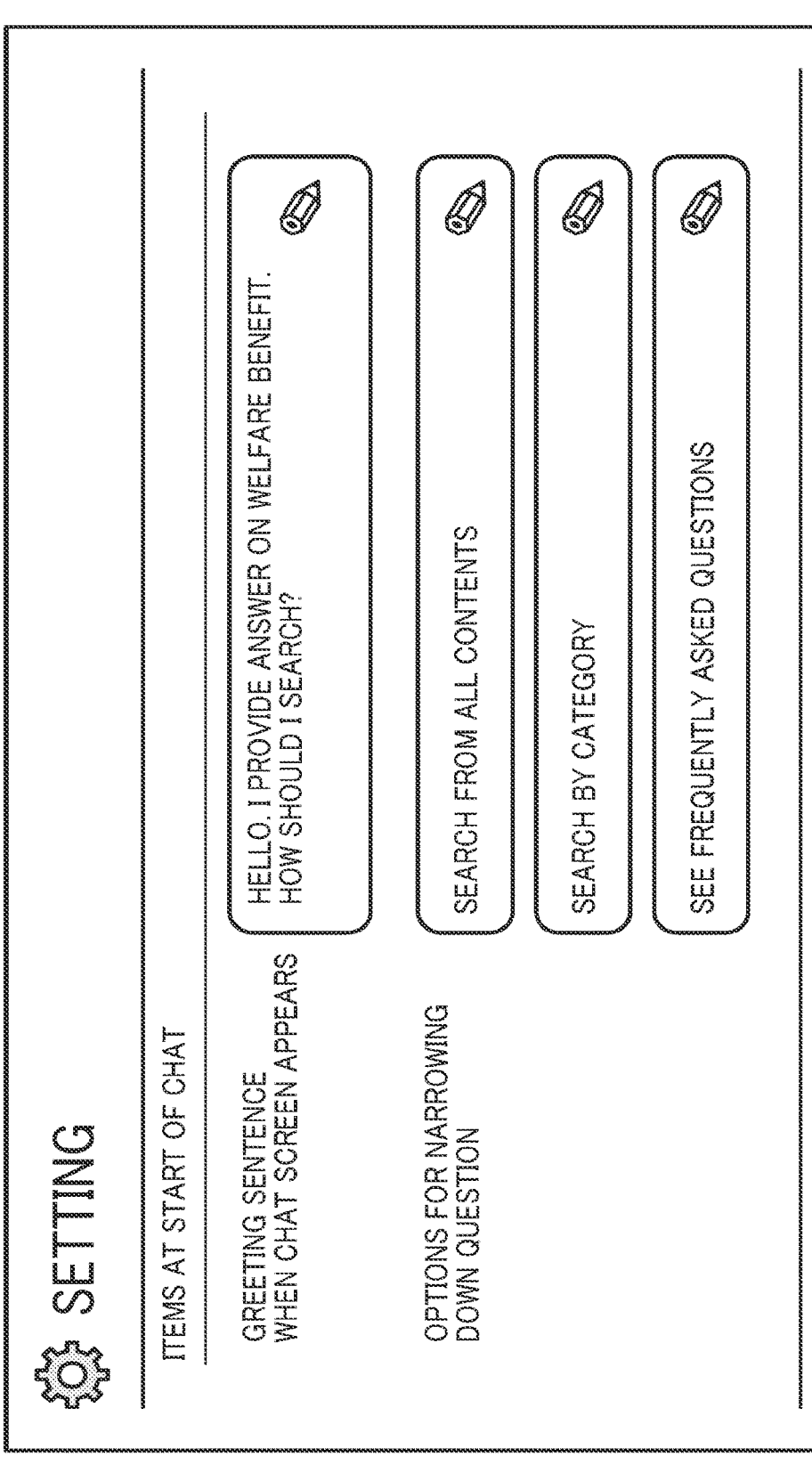

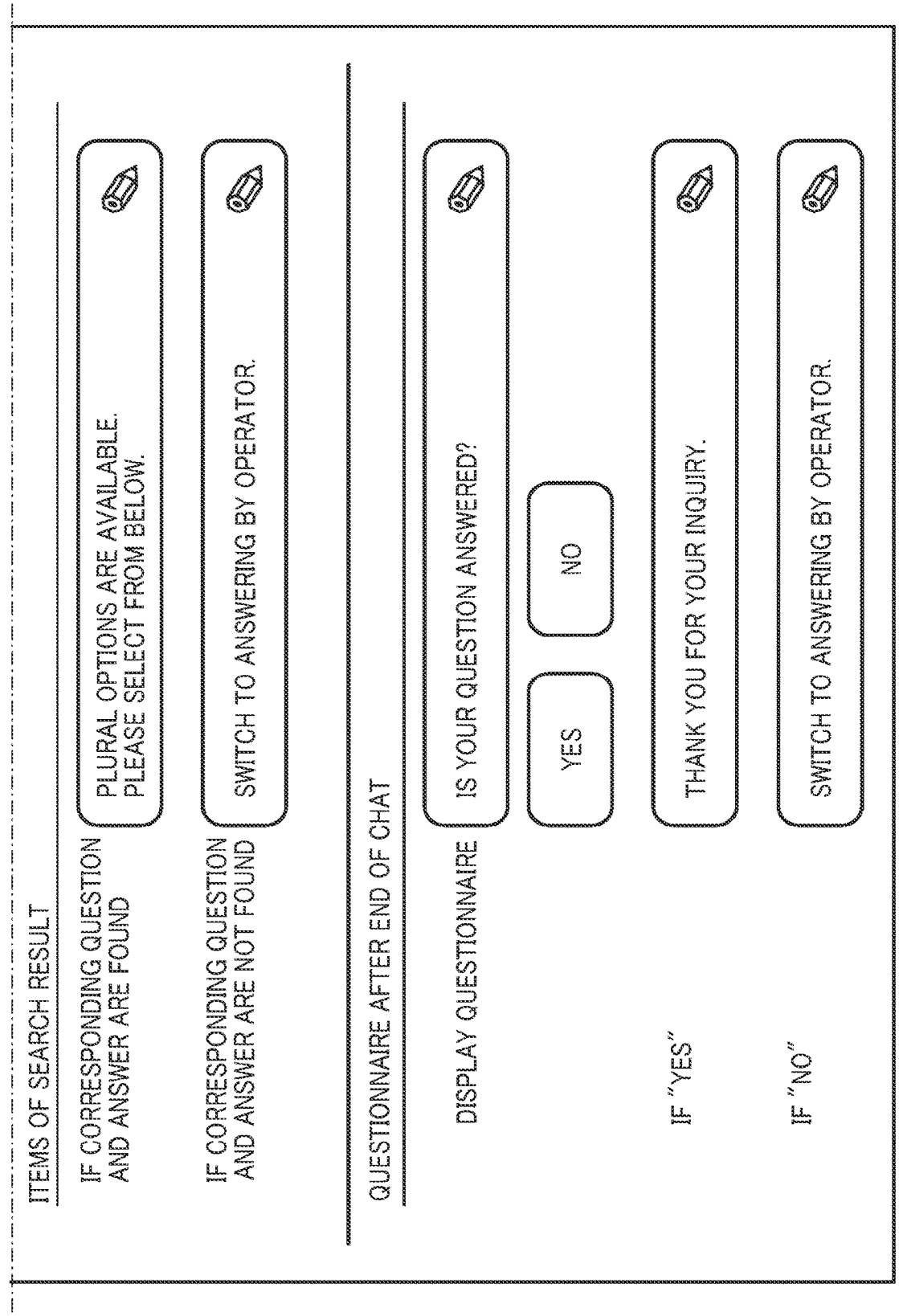

INFORMATION PROCESSING APPARATUS TO OUTPUT ANSWER INFORMATION IN RESPONSE TO INQUIRY INFORMATION

CROSS-REFERENCE TO RELATED APPLICATIONS

This patent application is a divisional application of U.S. application Ser. No. 16/513,955, filed Jul. 17, 2019, which is based on and claims priority pursuant to 35 U.S.C. § 119(a) to Japanese Patent Application No. 2018-137006, filed on Jul. 20, 2018, in the Japan Patent Office, the entire disclosure of which is hereby incorporated by reference herein.

BACKGROUND

Technical Field

The present disclosure relates to an information processing apparatus, a method, and a non-transitory computer-readable medium.

Description of the Related Art

An automatic answering technology so-called a bot has been developed. The bot outputs appropriate answers to questions of users including customers and an internal staff.

In particular, the questions that are frequently asked by the users are also referred to as Frequently Asked Questions (FAQ), and it is possible to uniformly answer the expected questions. Thus, such questions can efficiently be processed by automatic answering by the bot.

SUMMARY

Embodiments of the present disclosure describe an information processing apparatus that outputs answer information corresponding to inquiry information that is input. The information processing apparatus includes a memory and circuitry. The memory is configured to store a plurality of databases each having at least a first field in which a word related to the inquiry information is stored and a second field in which the answer information is stored. The circuitry is configured to: perform morphological analysis on the inquiry information that is input, to divide the inquiry information into morphemes; perform a first matching process based on the morphemes and the first field of each of the plurality of databases stored in the memory, to determine whether to adopt the database as an extraction source from which the answer information is to be extracted; and perform a second matching process based on the morphemes and the first field of the database, which is determined to be adopted as the extraction source, to output, as the answer information, data in the second field corresponding to data in the first field.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 4A and 4B are tables of a user information database and an answer source information database, according to an embodiment of the present disclosure;

FIGS. 5A, 5B, 5C, and 5D are tables of examples of an FAQ database, according to an embodiment of the present disclosure;

FIGS. 7A and 7B are views illustrating screen examples of a terminal that inquires a question, according to an embodiment of the present disclosure;

FIGS. 8A and 8B are views illustrating screen examples of the terminal that inquires the question, according to an embodiment of the present disclosure;

FIGS. 13A and 13B are a view illustrating an example of a screen on which settings for dialogue scenario is configured, according to another embodiment of the present disclosure.

Figure 1:
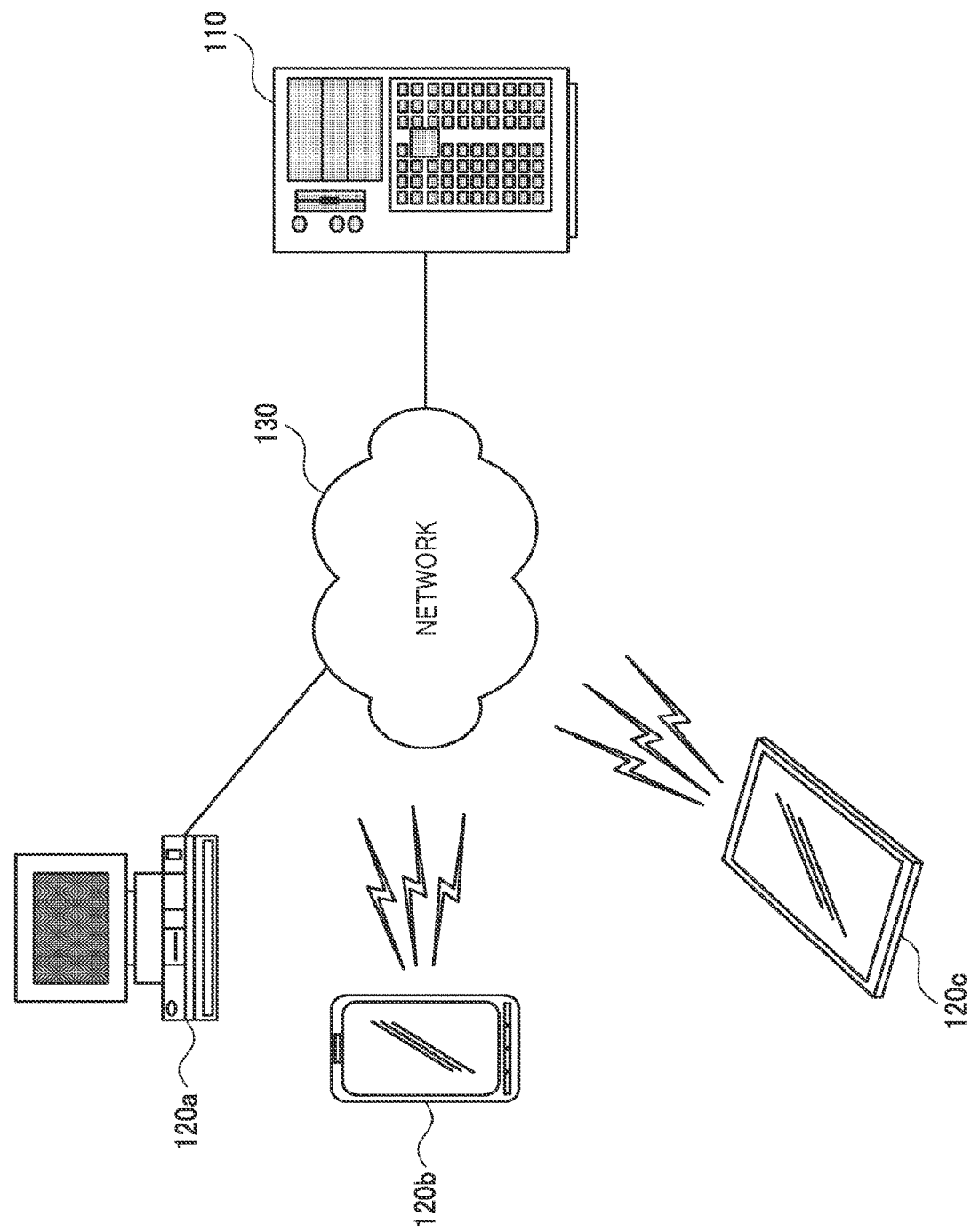
FIG. 1 is a view illustrating a schematic configuration of hardware in an entire system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A description will hereinafter be made on the present disclosure by using an embodiment. However, the present disclosure is not limited to the embodiment, which will be described later. In the drawings referred to below, common elements will be denoted by the same reference numerals, and a description thereon will appropriately be omitted.

FIG. 1 is a view illustrating a schematic configuration of hardware in an entire system according to an embodiment of the present disclosure. A system 100 illustrated in FIG. 1 exemplifies environment where an information processing apparatus 110 and a terminal 120 are connected via a network 130 such as the Internet or a local area network (LAN). A method for connecting to the network 130 from the information processing apparatus 110 and the various terminals 120 may be wired communication or wireless communication.

The information processing apparatus 110 is a device such as a server, and executes a process to accept a user's question transmitted from the terminal 120 and to answer the question.

The terminal 120 is a device, examples of which are a personal computer 120a, a smartphone 120b, and a tablet computer 120c, and transmits to the question, which is received through an operation by the user as a questioner, to the information processing apparatus 110 via the network 130. The terminal 120 includes a screen for displaying an answer and the like transmitted from the information processing apparatus 110, and provides various types of information to the user.

Figure 2:
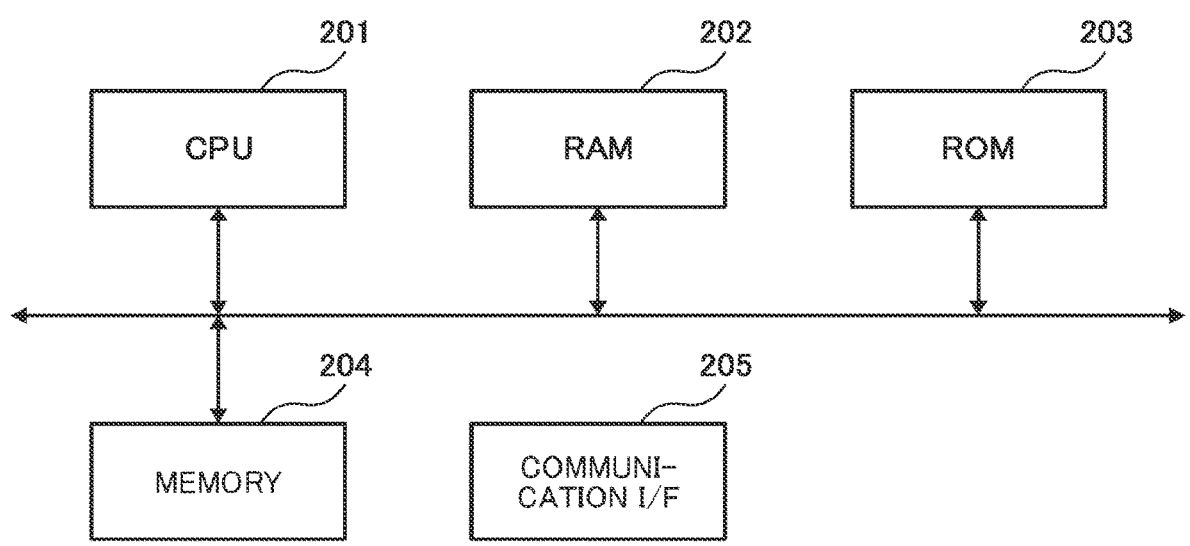
FIG. 2 is a diagram illustrating an example of hardware of an information processing apparatus, according to an embodiment of the present disclosure.

Next, a description will be made on a hardware configuration of the information processing apparatus 110. FIG. 2 is a diagram illustrating the configuration of the hardware included in the information processing apparatus 110 according to the present embodiment. The information processing apparatus 110 includes a central processing unit (CPU) 201, a random access memory (RAM) 202, a read-only memory (ROM) 203, a storage device 204, and a communication interface (I/F) 205. The hardware units are coupled to each other via a bus.

The CPU 201 is a unit that executes a program for controlling operation of the information processing apparatus 110 and executes a predetermined process. The RAM 202 is a volatile memory that provides an execution space for the program executed by the CPU 201, and is used to store and load the program and data. The ROM 203 is a non-volatile memory that stores the program, firmware, and the like executed by the CPU 201.

The storage device 204 is a non-volatile readable/writable memory storing: an operating system that causes the information processing apparatus 110 to function; various applications, setting information, various types of data; and the like. Examples of the storage device 204 are a hard disk drive (HDD) and a solid state drive (SSD). The communication I/F 205 connects the information processing apparatus 110 and the network 130, to allow the information processing apparatus 110 to communication with another device via the network 130. The communication via the network 130 may be any one of the wired communication and the wireless communication, and the various types of data can be exchanged using a predetermined communication protocol such as TCP/IP.

Figure 3:
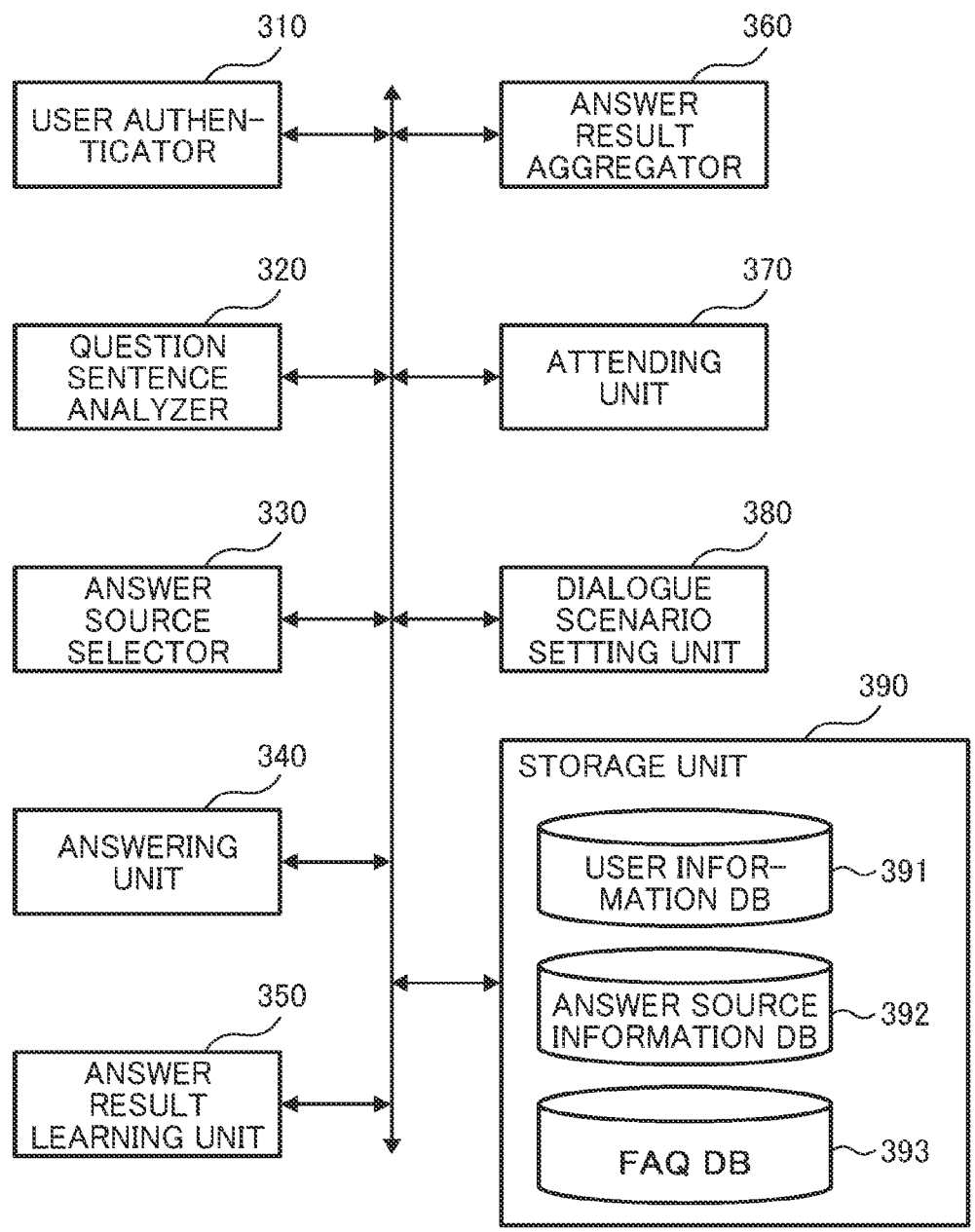
FIG. 3 is a block diagram illustrating software configuration of the information processing apparatus, according to an embodiment of the present disclosure.

The description has been made so far on the configuration of the hardware included in the information processing apparatus 110 according to the present embodiment. Next, a description will be made on a function executed by each of the hardware units in the present embodiment with reference to FIG. 3. FIG. 3 is a block diagram of software included in the information processing apparatus 110 according to the present embodiment.

The information processing apparatus 110 according to the present embodiment includes functional blocks that are a user authenticator 310, a question sentence analyzer 320, an answer source selector 330, an answering unit 340, an answer result learning unit 350, an answer result aggregator 360, an attending unit 370, and a storage unit 390. In another preferred embodiment, the information processing apparatus 110 may include a dialogue scenario setting unit 380. The detailed description will be made below on each of the functions.

The user authenticator 310 authenticates login of the user who asks the question. Since the user authenticator 310 authenticates the user, an answer based on the user's affiliation information and the like can be provided, and a further appropriate answer to the question is selected.

The question sentence analyzer 320 analyzes a question sentence received from the terminal 120 via the communication I/F 205. The question sentence analyzer 320 performs a so-called morphological analysis on the question input as a natural sentence by the user, and analyzes the question as morphemes that constitute the question sentence. The question sentence analyzer 320 notifies the answer source selector 330 of the analyzed morphemes.

Based on the morphemes analyzed by the question sentence analyzer 320, the answer source selector 330 selects a database that serves as an answer source. The database can be selected by a matching process that compares the morphemes with information, such as tags, associated with each of the databases. For example, based on a degree of the association between each of the morphemes and an associated information tag in the corresponding database, the answer source selector 330 determines whether to select such a database as the answer source. The answer source selector 330 executes the matching process and the determination process described above for each of the databases, to specify the database serving as the answer source. By selecting the database that contains related words and phrases just as described, the appropriate answer can be provided to the user's question.

Note that, in the case where the user logs in, the answer source selector 330 may select the database based on information on each of the users in addition to a result of the above matching process. In this way, the database can be selected based on the individual information of each of the users. Thus, it is easy to output the answer that matches the user's intention.

The answering unit 340 extracts answer information to the user's question from the database, notifies the user of the prepared answer, and thereby provides the answer. Based on the morphemes output from the question sentence analyzer 320, the answering unit 340 searches the database selected by the answer source selector 330. More specifically, the answering unit 340 executes a matching process based on the morphemes and the words and the phrases included in the database, to extract the answer information to be output as the answer. As an example, the words and phrases included in the database are the words and the phrases related to the answer information. Here, a format of an FAQ database serving as the answer source may differ from by database. Thus, the answering unit 340 can execute the search according to the format of each of the answer source databases.

The answer result learning unit 350 reflects the result of the answer provided to the user by the answering unit 340, as learning data, in the various databases. For example, in the case where the user's question is solved by the content of the answer, the answer result learning unit 350 associates and reflects the question and the answer in the database. On the contrary, in the case where the user's question is not solved, the answer result learning unit 350 lowers and reflects a degree of the association between the question and the answer in the database. The answer result learning unit 350 learns the association between the question and the answer, just as described. In this way, the appropriate answer to a similar question that will be asked later can easily be obtained.

The answer result aggregator 360 aggregates the results of the answers provided to the users by the answering unit 340. For example, the answer result aggregator 360 creates a ranking list based on the number of times the questions are asked, and aggregates evaluations of whether the user's question is answered, the user's satisfaction level with the answer, and the like. The answer result aggregator 360 provides an administrator or the like with an aggregation result, to be able to analyze use situations and the like. In this way, the administrator can make settings based on the aggregation result such that the further appropriate answer can be output.

In the case where it is difficult to answer the question by a bot, the attending unit 370 answers the question by person-to-person correspondence. For example, in the case where the answer to the user's question is unavailable in any of the FAQ databases serving as the answer source, in the case where the question is not solved by the answer provided by the bot, and the like, the attending unit 370 notifies an operator of the question. Then, the operator who receives the notification provides the answer. In this way, the appropriate answer can be provided for the user's question.

The information processing apparatus 110 according to the above-described embodiment is configured to accept the question when the user inputs the question sentence. However, the information processing apparatus 110 may accept the question by a method other than the above. For example, an information processing apparatus 110 in another preferred embodiment can accept the question in such a format that the user and the bot make conversation in a chat (hereinafter referred to as a dialogue format). In such a case, the information processing apparatus 110 may be configured to include a dialogue scenario setting unit 380. The dialogue scenario setting unit 380 selects the database and sets the content of a dialogue used to accept the question. The dialogue scenario setting unit 380 can make options to be presented to the user settings for presenting next options in accordance with the option, and the like.

The storage unit 390 controls the storage device 204 and stores the various databases. The storage unit 390 includes a user information database 391, an answer source information database 392, and an FAQ database 393. Here, a description will be made on each of the databases with reference to FIGS. 4A and 4B and FIGS. 5A, 5B, 5C, and 5D. FIGS. 4A and 4B are tables illustrating examples of the user information database 391 and the answer source information database 392 according to the present embodiment. FIGS. 5A, 5B, 5C, and 5D are tables illustrating examples of the FAQ database 393 according to the present embodiment.

As illustrated in FIG. 4A, the user information database 391 is configured that fields storing an ID for identifying the user, a department to which the user belongs, and a post of the user are associated with each other. The user authenticator 310 refers to the user information database 391 and can thereby acquire various types of information on the user who has logged in. In addition, since the user authenticator 310 acquires the user information, an answer suited for the department and the post of each of the users is provided.

As illustrated in FIG. 4B, the answer source information database 392 is configured that fields storing a name of the FAQ database serving as the answer source and tag information indicative of the related words and the related phrases are associated with each other. For example, a sales department FAQ is associated with the words and the phrases such as "ON SALE" and "SPECIFICATION" that are keywords assumed to be inquired by the users belonging to the sales department. Note that the tag information in the answer source information database 392 may be set individually or may be set in a manner to be linked with tags in each of the FAQ databases, which will be described below.

As illustrated in FIGS. 5A, 5B, 5C, and 5D, the FAQ database 393 is configured that fields storing the tags associated with the questions and the answer information are associated with each other. As an example, the answer information stored in the FAQ database 393 can each be set as an item for the question that is frequently asked (FAQ). For example, in the case where the sales department is frequently inquired about product specifications, as illustrated in FIG. 5A, the specifications of each of the products are stored in association with each other by product name in a sales department FAQ database 393a. In addition, the sales department FAQ database 393a may store, as the tag information, the words and the phrases associated with each of the products.

Similarly, in FIGS. 5B, 5C, and 5D, the answer information to the questions that are frequently asked to each of the departments is stored in association with each of the departments serving as the answer sources. In particular, in the present embodiment, as illustrated in FIGS. 5A, 5B, 5C, and 5D, the storage unit 390 includes a plurality of FAQ databases 393. Accordingly, the answer source selector 330 can select the appropriate answer source for the question.

A configuration of each of the various databases illustrated in FIGS. 4A and 4B and FIGS. 5A, 5B, 5C, and 5D merely constitutes an example, and thus does not limit the embodiment.

The description has been made so far on the functional blocks included in the information processing apparatus 110 according to the present embodiment with reference to FIG. 3 to FIGS. 5A, 5B, 5C, and 5D. The software block illustrated with reference to FIG. 3 corresponds to the functional blocks that are implemented when the CPU 201 executes the program in the present embodiment to cause each hardware to function. The functional blocks described in each of the embodiments may entirely be implemented as software, or can entirely or partially be implemented as hardware that provides equivalent functions.

Furthermore, at least one of the above-described functional blocks may not be included by having the configuration as illustrated in FIG. 3. For example, in another preferred embodiment, each of the functional blocks may be implemented by cooperation of the information processing apparatus 110 and the terminal 120.

Figure 6:
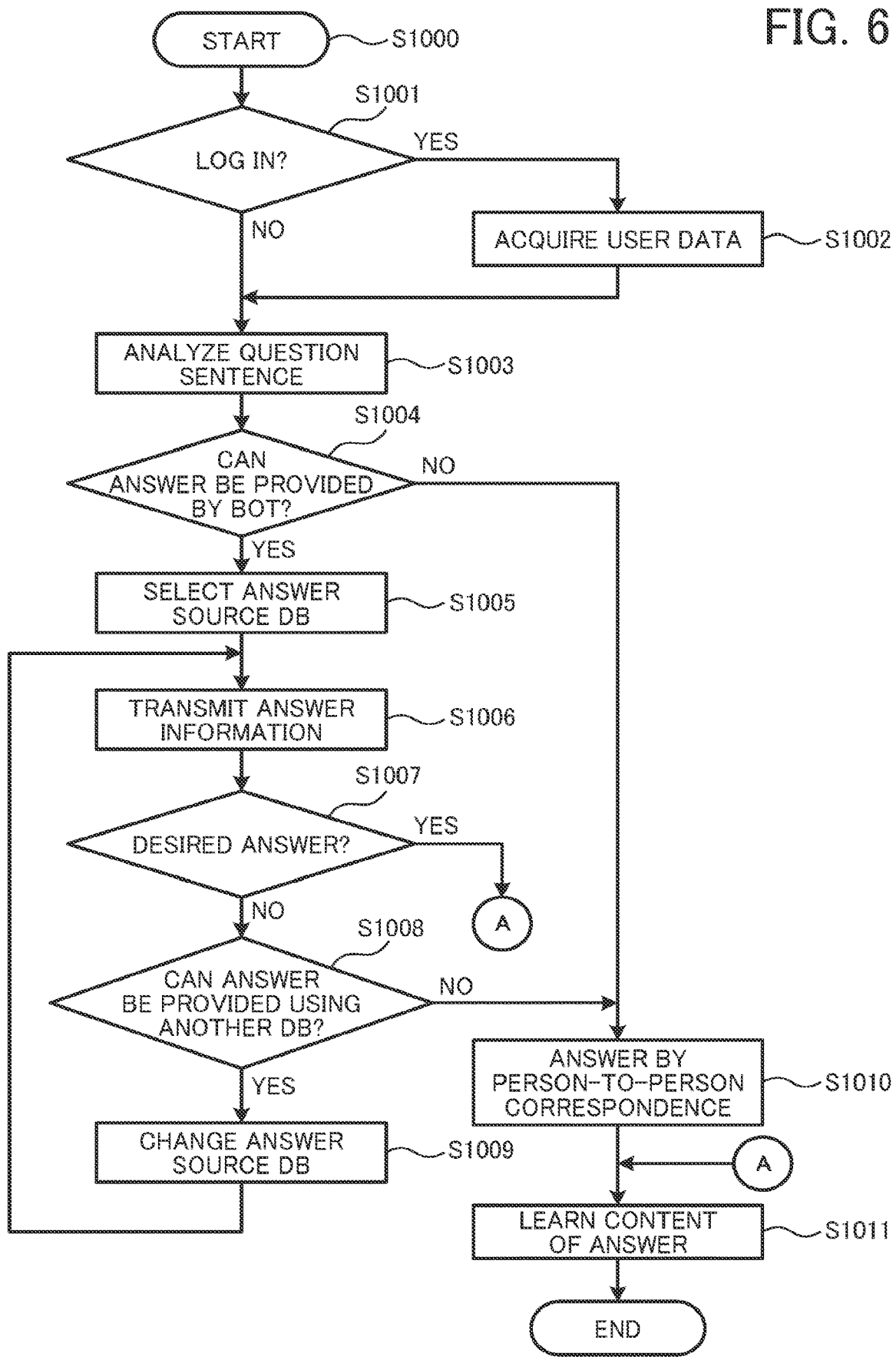
FIG. 6 is a flowchart illustrating an operation executed by the information processing apparatus, according to an embodiment of the present disclosure.

Next, a description will be made on a process executed by the various functional blocks described above. FIG. 6 is a flowchart illustrating a process executed by the information processing apparatus 110 according to the present embodiment. The information processing apparatus 110 starts the process in step S1000. In step S1001, the process is branched depending on whether the user who operates the terminal 120 logs in. When the user does not log in (NO), the process proceeds to step S1003. On the other hand, when the user logs in (YES), the process proceeds to step S1002, and the user authenticator 310 acquires the various types of the information on the user from the user information database 391.

In step S1003, the information processing apparatus 110 accepts the question from the user, and the question sentence analyzer 320 makes the morphological analysis on the accepted question sentence. Thereafter, in step S1004, the answer source selector 330 executes the matching process based on each of the morphemes and the associated information tag, which corresponds to at least one of the databases. Then, the process is branched based on a determination of whether the answer can be provided by the bot.

In step S1004, when the answer can be provided by the bot (YES), the process proceeds to step S1005. On the other hand, when it is difficult to answer by the bot (NO), the process proceeds to step S1010, and the answer is provided by the person-to-person correspondence. Examples of a case where it is difficult to provide the answer by the bot are a case where the content of the question is unclear to the extent that prevents the morphological analysis from being made, and a case where the extracted morpheme is not included in any of the databases.

Note that, in the case where the user logs in, the answer source selector 330 may determine whether to adopt at least one of the databases as the answer source based on the morphemes and the information on the user acquired in step S1002.

In step S1005, the answer source selector 330 determines and selects the FAQ database 393 to be adopted as the answer source based on the result of the matching process in step S1004. In step S1006, the answering unit 340 transmits, to the user, the answer information that is extracted based on the matching process between each of the morphemes and each of the fields in the FAQ database 393 selected as the answer source. Together with the answer, the answering unit 340 transmits a notification that inquires of the user about whether the question is answered.

In step S1007, the process is branched depending on whether the user's question is answered, that is, whether a desired answer by the user is provided. When the desired answer is provided (YES), the process proceeds to step S1011. On the other hand, when the desired answer is not provided (NO), the process proceeds to step S1008.

In step S1008, the answer source selector 330 determines whether the answer can be provided by another answer source database. When it is impossible to answer by the other answer source database (NO), the process proceeds to step S1010, and the answer is provided by the person-to-person correspondence. When the answer can be provided by the other answer source database (YES), the process proceeds to step S1009, and answering by the bot continues. An example of a case where the answer can be provided by the other answer source database is a case where there is a plurality of FAQ databases determined to be adopted as the answer source in step S1005, and where one of the other FAQ databases is selected.

In step S1009, the answer source selector 330 selects the other FAQ database as the answer source. Thereafter, the information processing apparatus 110 returns the process to step S1006. The information processing apparatus 110 repeats the process in above-described step S1006 onward until the user's question is answered or until it is determined that answering by the bot is difficult.

In the case where it is determined that answering by the bot is difficult in one of step S1004 and step S1009, the answer source selector 330 selects the person-to-person correspondence. In the case where the answer source selector 330 selects the person-to-person correspondence, in step S1010, the attending unit 370 notifies the operator of the question, and the operator who receives the notification answers the question.

In step S1011, the answer result learning unit 350 reflects the result of the answer provided to the user, as the learning data, in the various databases, to learn the answer result. For example, in the case where the answer requested by the user is obtained by the bot, the answer result learning unit 350 associates and stores the morphological analysis result of the question and the content of the answer in the various databases. As a result, the information processing apparatus 110 can learn the answer result, to be able to improve accuracy of the answers to the next and subsequent inquiries. The answer result learning unit 350 can also learn the answer other than the user's desired answer. Thus, in the case where a similar question arises next time onward, such an answer is excluded to answer the similar question. As a result, the user is more likely to obtain the desired answer. Furthermore, the answer result learning unit 350 can learn the result of the answer provided by the operator. Thus, in the case where the similar question arises next time onward, such a question can be answered by the bot. As a result, a burden on the operator can be alleviated.

By the process described with reference to FIG. 6, the appropriate answer source can be selected to answer based on the user's question. In addition, since the answer source can be selected from the various databases based on the question sentence, the user is more likely to obtain the appropriate answer. Furthermore, the question is answered by the operator when it is difficult to answer the question by the bot. Thus, the number of times the operator handles the question can be reduced. Therefore, the burden on the operator can be alleviated.

Hereinafter, the present embodiment will be described by using further specific examples with reference to FIGS. 7A and 7B to FIGS. 10A and 10B. FIGS. 7A and 7B to FIGS. 10A and 10B are views illustrating screen examples of the terminal 120 that inquires the question in the present embodiment. The following description will also be made with appropriate reference to FIGS. 4A and 4B to FIG. 6.

Figure 7A:
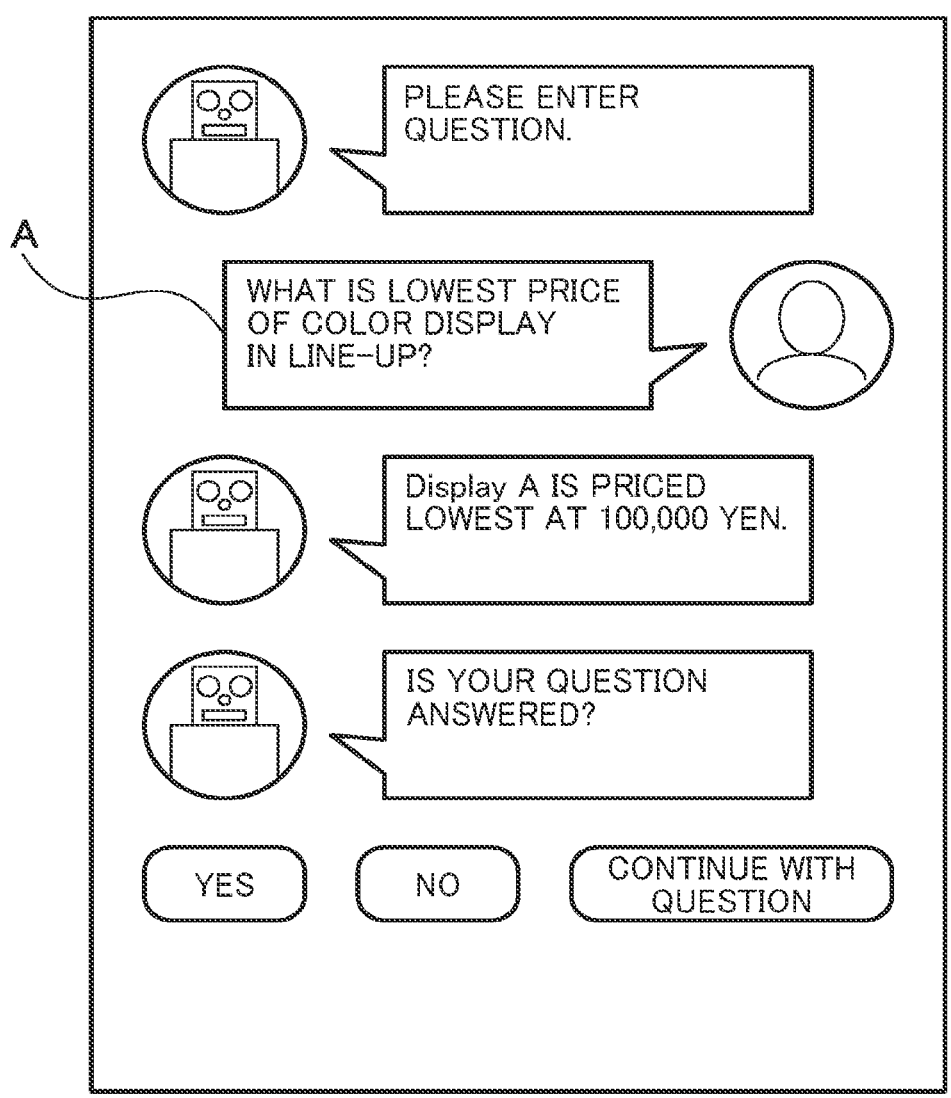

FIG. 7A illustrates an example of the screen that displays an answer to a question by the user who asks, "WHAT IS LOWEST PRICE OF COLOR DISPLAY IN LINE-UP?" (hereinafter referred to as a question A). In this example, when the question sentence analyzer 320 morphologically analyzes the question A (step S1003), as illustrated in FIG. 7B, words including "COLOR DISPLAY", "LINE-UP", "LOWEST", and "PRICE" are extracted and output as the morphemes.

The answer source selector 330 refers to the answer source information database 392 in the matching process of the morphemes, and determines whether the answer can be provided by the bot (step S1004). In the case where the answer can be provided by the bot, the answer source selector 330 determines whether each of the databases is appropriate as the answer source, and selects the database to be adopted as the answer source (step S1005). As an example of a method for selecting the database serving as the answer source, such a database can be determined by whether the morphemes extracted by the morphological analysis are included in the associated information tags.

Referring to the answer source information database 392 in the example illustrated in FIG. 7B, the associated information tags in a sales department FAQ database include the word "LINE-UP" extracted from the question A. In addition, an accounting department FAQ database includes the words "PRICE" and "LOWEST", and a product management department FAQ database includes the word "COLOR DISPLAY". Here, the associated information tag in the accounting department FAQ database includes the largest number of the extracted morphemes. Accordingly, the answer source selector 330 can determine that the accounting department FAQ database has a high possibility of appropriately answering the question A, and thus selects the accounting department FAQ database as the answer source database (step S1005).

In the example illustrated in FIG. 7B, the number of the morphemes that are included in each of the fields storing the associated information tags is evaluated, to select the database serving as the answer source. However, the evaluation may be made by a method other than the above. For example, the words and the phrases in the associated information tag may be weighted and evaluated for the selection. Alternatively, the results of the answers provided so far may be evaluated based on a record of learning for the selection.

When the answer source selector 330 selects the answer source database, the answering unit 340 refers to the selected database and searches for the answer to the question A. In the example illustrated in FIGS. 7A and 7B, since the accounting department FAQ database is selected, the answer is searched from such a database. Here, the product "Display A" includes the tag "LOWEST", and thus can be used as the answer to the Question A. Accordingly, the answering unit 340 creates an answer "Display A IS PRICED LOWEST AT 100,000 YEN.", and notifies the terminal 120 of the answer (step S1006).

Together with the answer, the answering unit 340 may transmit a notification "IS YOUR QUESTION ANSWERED?", and may inquire of the user about whether the question is answered (step S1007). In this way, it is possible to determine whether the user's desired answer is provided, and answer data is registered to learn the content of the answer (step S1011). A specific example of learning of the answer is that the answer result learning unit 350 adds the word and the phrase included in the question sentence to the associated information tags in the answer source information database 392.

Figure 8A:
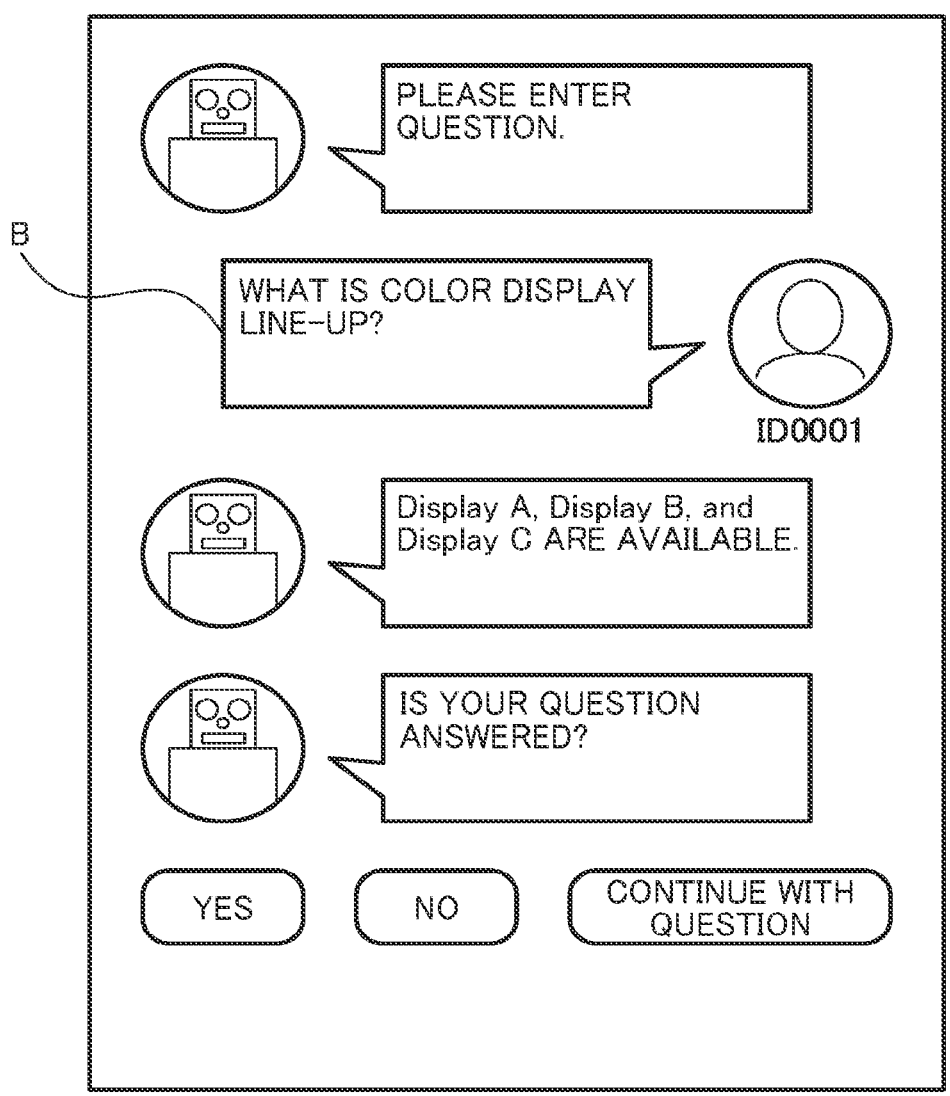

Next, a description will be made on an example illustrated in FIGS. 8A and 8B. FIGS. 8A and 8B illustrates an example of a case where the user logs in and where the database serving as the answer source is selected based on the user information. When the user logs in (step S1001, YES), the user authenticator 310 acquires the information on the user from the user information database 391 (step S1002). Here, it is assumed that the user with ID0001, who is a non-management employee of the sales department, logs in.

FIG. 8A illustrates an example of the screen that displays an answer to a question by the user who is identified as ID0001 and asks, "WHAT IS COLOR DISPLAY LINE-UP?" (hereinafter referred to as a question B). In this example, when the question sentence analyzer 320 morphologically analyzes the question B (step S1003), as illustrated in FIG. 8B, the words including "COLOR DISPLAY" and "LINE-UP" are extracted and output as the morphemes.

The answer source selector 330 refers to the answer source information database 392 based on the user information and the morphemes, and determines whether the answer can be provided by the bot (step S1004). In the case where the answer can be provided by the bot, the answer source selector 330 executes the process to select the appropriate database as the answer source (step S1005). The database serving as the answer source can be selected in a same manner to the example of the question A in FIGS. 7A and 7B. However, in the example of FIGS. 8A and 8B, the database serving as the answer source can be selected in consideration of the user information.

For example, the associated information tag in the sales department FAQ database includes "LINE-UP", and the associated information tag in the product management department FAQ database includes "COLOR DISPLAY". Thus, the answer source selector 330 can select these FAQ databases as candidates for the answer source. However, when the user information is considered here, the user with ID0001 belongs to the sales department. Thus, there is a high probability that the question B is intended to be related to the sales department. Thus, the answer source selector 330 selects the sales department FAQ database as the answer source database, thereby the answer information that matches the intention of the user's question is output.

As it has been described so far, the answer source selector 330 selects the sales department FAQ database as the answer source (step S1005). Thereafter, the answering unit 340 refers to the selected database, and searches for and outputs the answer information to the question B. In the example illustrated in FIG. 8A, the question is asked about the line-up. Thus, the answering unit 340 can create and output an answer such as "Display A, Display B, and Display C ARE AVAILABLE." (step S1006).

Just as described, the answer source is selected based on the question sentence and the information on the user. As a result, it is possible to provide the answer further close to the user's intention. In addition, the user information may put a restriction on the answer obtained by the corresponding user. For example, in the case where the FAQ database 393 serving as the answer source includes confidential information, the answer may have the content that should not be disclosed depending on a post of the user. In such a case, the answer source selector 330 can exclude such an FAQ database from the candidates for the answer source. Just as described, when the user information is considered, the FAQ database 393, which serves as the answer source further appropriately, can be selected.

Figure 9A:
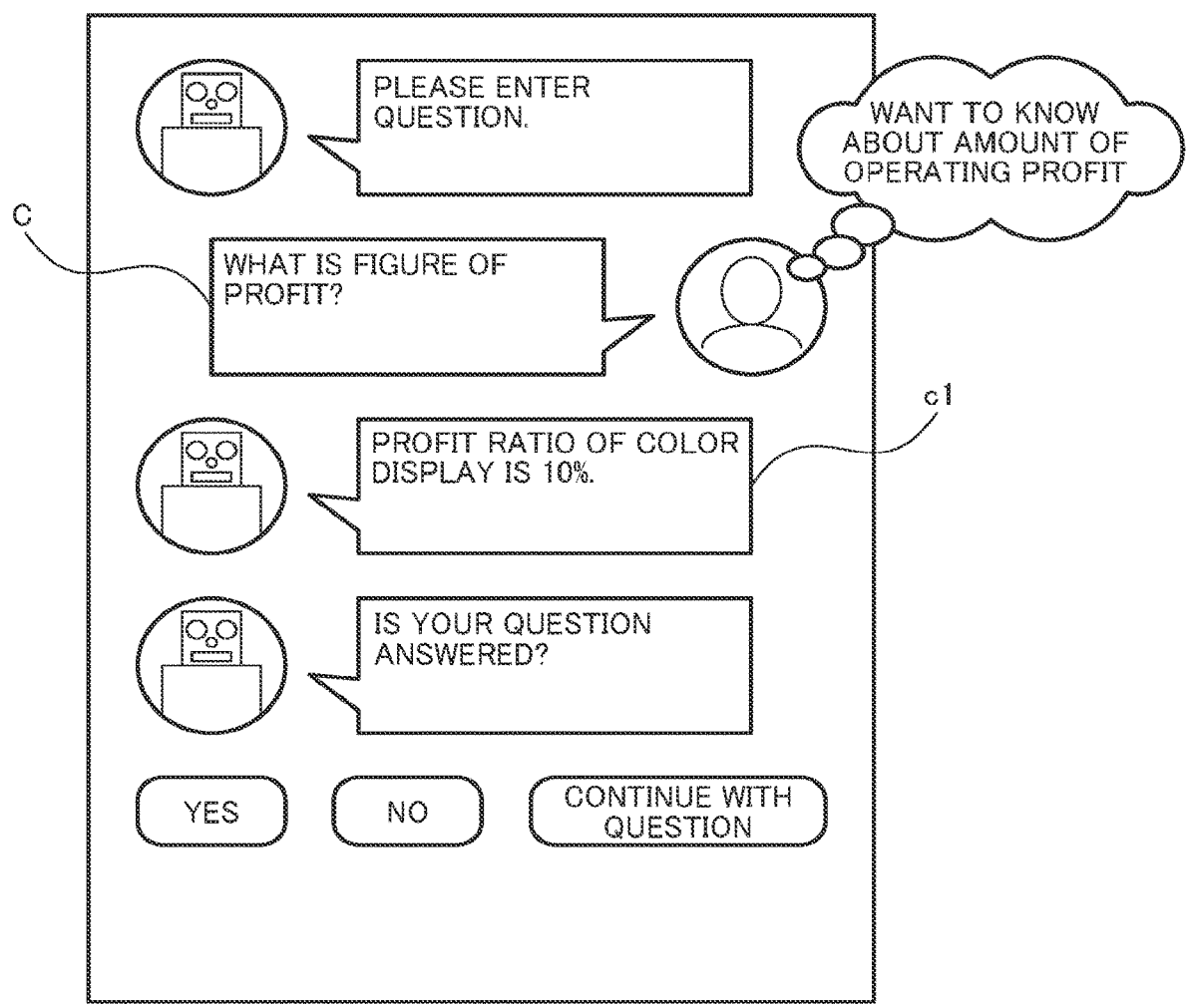
FIGS. 9A and 9B are views illustrating screen examples of the terminal that inquires the question, according to an embodiment of the present disclosure.

Next, a description will be made on examples illustrated in FIGS. 9A and 9B and FIGS. 10A and 10B. FIGS. 9A and 9B and FIGS. 10A and 10B illustrates examples of screen display in the case where the user does not obtain the desired answer. In FIG. 9A, it is assumed that the user who wants to know about an amount of operating profit asks a question "WHAT IS FIGURE OF PROFIT?" (Hereinafter referred to as a question C).

Figure 9B:
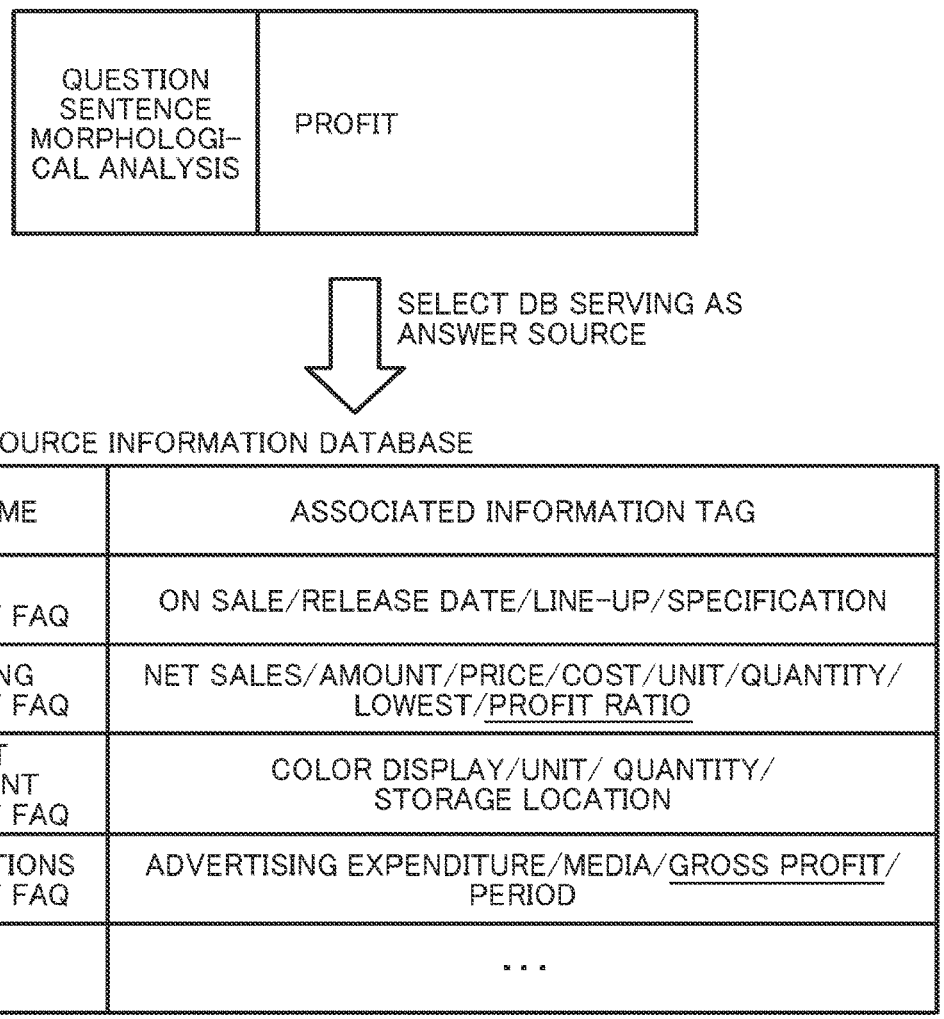

In this example, when the question sentence analyzer 320 morphologically analyzes the question C (step S1003), as illustrated in FIG. 9B, the word "PROFIT" is extracted and output as the morpheme. Similar to the cases illustrated in FIGS. 7A and 7B and FIGS. 8A and 8B, the answer source selector 330 refers to the answer source information database 392, and determines whether the answer can be provided by the bot (step S1004). In the case where the answer can be provided by the bot, the answer source selector 330 executes the process to select the appropriate database as the answer source (step S1005).

First, it is assumed here that the accounting department FAQ database, in which the phrase "PROFIT RATIO" is included in the associated information tag, is selected. The answering unit 340 refers to the accounting department FAQ database, creates the answer related to "PROFIT", and notifies the user of the answer. In the example illustrated in FIG. 9A, the terminal 120 displays a result of the answer by the answering unit 340, "PROFIT RATIO OF COLOR DISPLAY IS 10%." (hereinafter referred to as an answer c1). However, the answer c1 is not the desired answer for the user who wants to know about the amount of the operating profit. Accordingly, the user selects "NO" in response to a notification displayed on the screen illustrated in FIG. 9A, "IS YOUR QUESTION ANSWERED?" (step S1007, NO).

The answer source selector 330 is notified that the user selects "NO", and determines whether the answer can be provided by the database other than the currently selected FAQ database (step S1008). In the example illustrated FIG. 9B, the associated information tag in the public relations department FAQ database includes the phrase "GROSS PROFIT". Thus, the answer source selector 330 determines that the answer can be provided by the public relations department FAQ database (step S1008, YES). Then, the answer source selector 330 changes the answer source database to the public relations department FAQ database (step S1009).

Figure 10A:
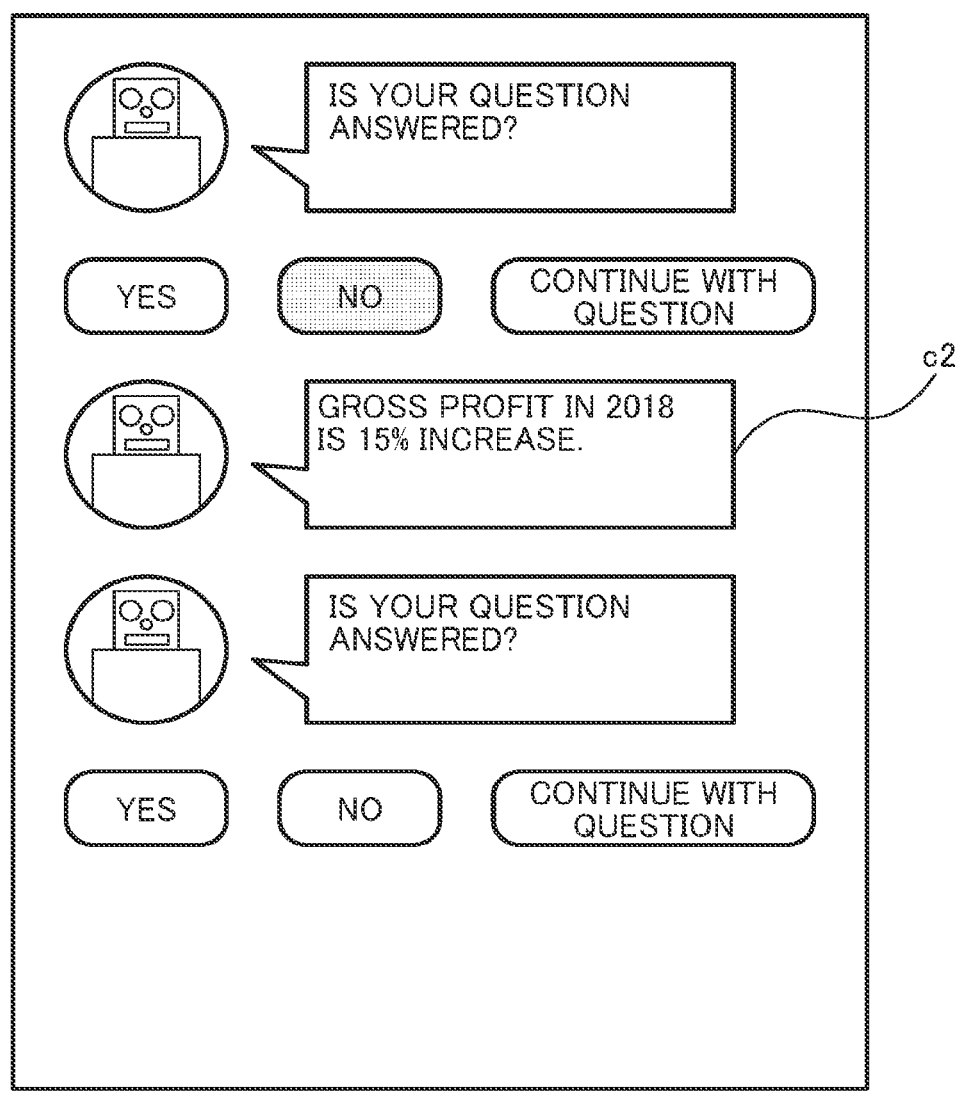
FIGS. 10A and 10B are views illustrating screen examples of the terminal that inquires the question, according to an embodiment of the present disclosure.

In response to the change of the answer source database, the answering unit 340 refers to the public relations department FAQ database, creates the answer, and transmits the answer to the terminal 120 (step S1006). Here, as illustrated in FIG. 10A, it is assumed that an answer "GROSS PROFIT IN 2018 IS INCREASED BY 15%." is provided (hereinafter referred to as an answer c2).

However, the answer c2 is not the desired answer for the user who wants to know about the amount of the operating profit, either. Thus, the user's question is not yet answered. Accordingly, the user again selects "NO" in response to the notification "IS YOUR QUESTION ANSWERED?" (step S1007, NO).

The answer source selector 330 determines again whether the answer can be provided by the database other than the currently selected FAQ database (step S1008). In the example of FIG. 9B, there is no other FAQ database related to "PROFIT". Thus, the answer source selector 330 determines that the answer is not provided by the other database (step S1008, NO). As a result, the answer source selector 330 switches to the person-to-person correspondence by the operator, and the attending unit 370 notifies the operator of the question C, the answers c1, c2, and the like to answer by the person-to-person correspondence (step S1010).

Figure 10B:
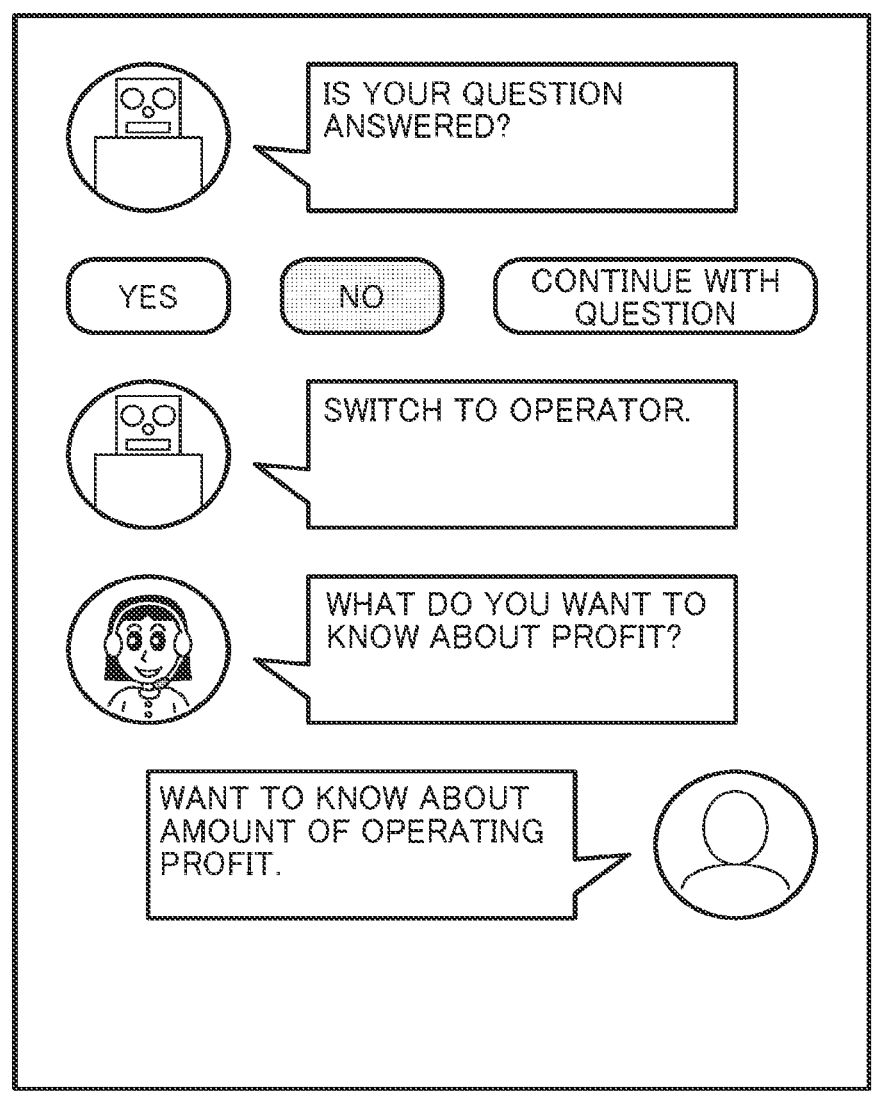

FIG. 10B illustrates an example of the screen on which the answering is switched to the person-to-person correspondence and the question answered by the operator is displayed. As illustrated in FIG. 10B, the operator asks for details of the question, asks about the intention of the user's question, and thus can provide the appropriate answer.

As described above, in the case where the displayed answer is not desired by the user, the FAQ database serving as the answer source is changed, or the operator handles the question. In this way, the user can easily obtain the desired answer. Note that the switching to the person-to-person correspondence by the operator is not limited to the above-described example. For example, in the case where the number of times the user selects that the provided answer is not the desired answer exceeds a threshold value, the answering may be switched to the person-to-person correspondence. In the case where the question is unclear like the question C, the answer source selector 330 may determine that it is impossible to provide the answer by the bot (step S1004, NO), and may provide the answer by the person-to-person correspondence (step S1010).

Figure 11A:
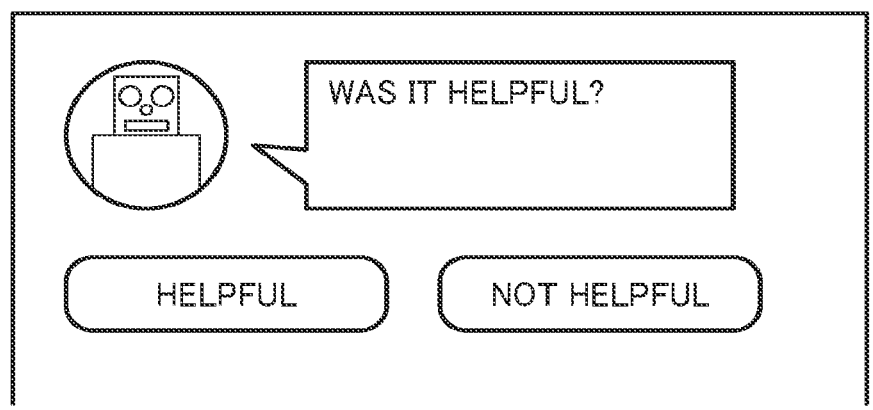
FIGS. 11A, 11B, and 11C are views illustrating examples of screens used to evaluate an answer, according to an embodiment of the present disclosure.
Figure 11B:
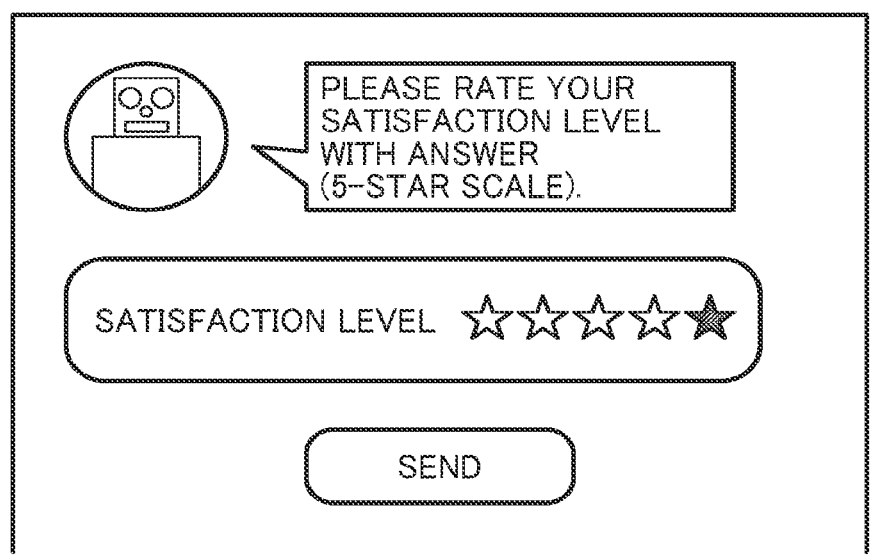
Figure 11C:
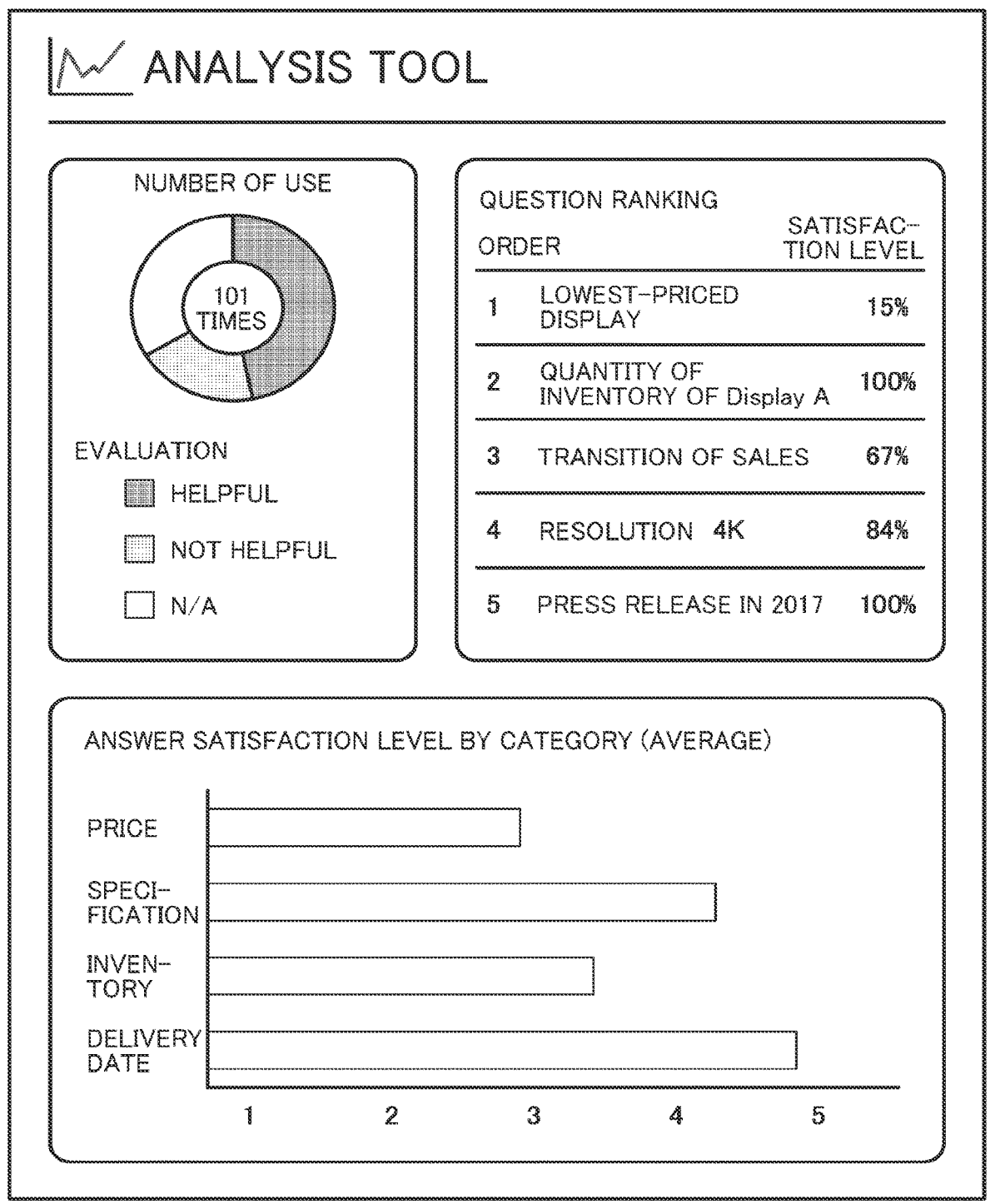

In FIGS. 7A and 7B to FIGS. 10A and 10B, in order to learn the answer result, the user as the questioner is requested to select whether the question is solved by the displayed answer. However, the user may provide a response on a screen as illustrated in FIGS. 11A and 11B. FIGS. 11A, 11B, and 11C are views illustrating examples of screens used to evaluate the answer in the present embodiment.

For example, in FIG. 11A, the answer to the question is displayed, and a message "WAS IT HELPFUL?" is also displayed. Then, the user evaluates the answer by "HELPFUL" or "NOT HELPFUL". In this way, it is possible to evaluate whether the answer result is appropriate.

In further another preferred embodiment, for example, as illustrated in FIG. 11B, the user may rate a satisfaction level of the answer for the evaluation. In FIG. 11B, as an example, the user is requested to rate the satisfaction level of the answer in a five-star scale. Just as described, in the case where the answer result is numerically evaluated, the answer that receives the higher evaluation than a threshold value can be set as a learning target. As a result, the answer result can efficiently be learned, and the accuracy of the answers to the next and subsequent questions can be improved.

Meanwhile, the answer result aggregator 360 aggregates the answer results acquired as described above, to be able to output the aggregated answer results as an analysis result as illustrated in FIG. 11C. As illustrated in FIG. 11C, examples of the analysis result are the number of times of using an answering system, breakdown of the evaluations by the users, a ranking list of the number of times the questions are asked, and satisfaction levels by category of the question. However, the analysis result is not limited to the above.

The administrator or the operator views the analysis result, and thus can make the settings such that the user can obtain the appropriate answer. For example, in the ranking list of the number of times the questions are asked, in the case where there is an item that is asked frequently but is evaluated with the low satisfaction level of the answer result, at least one of the associated information tag thereof and the FAQ database serving as the answer source is changed. In this way, it is possible to present the answer satisfied by the user.

Figure 12A:
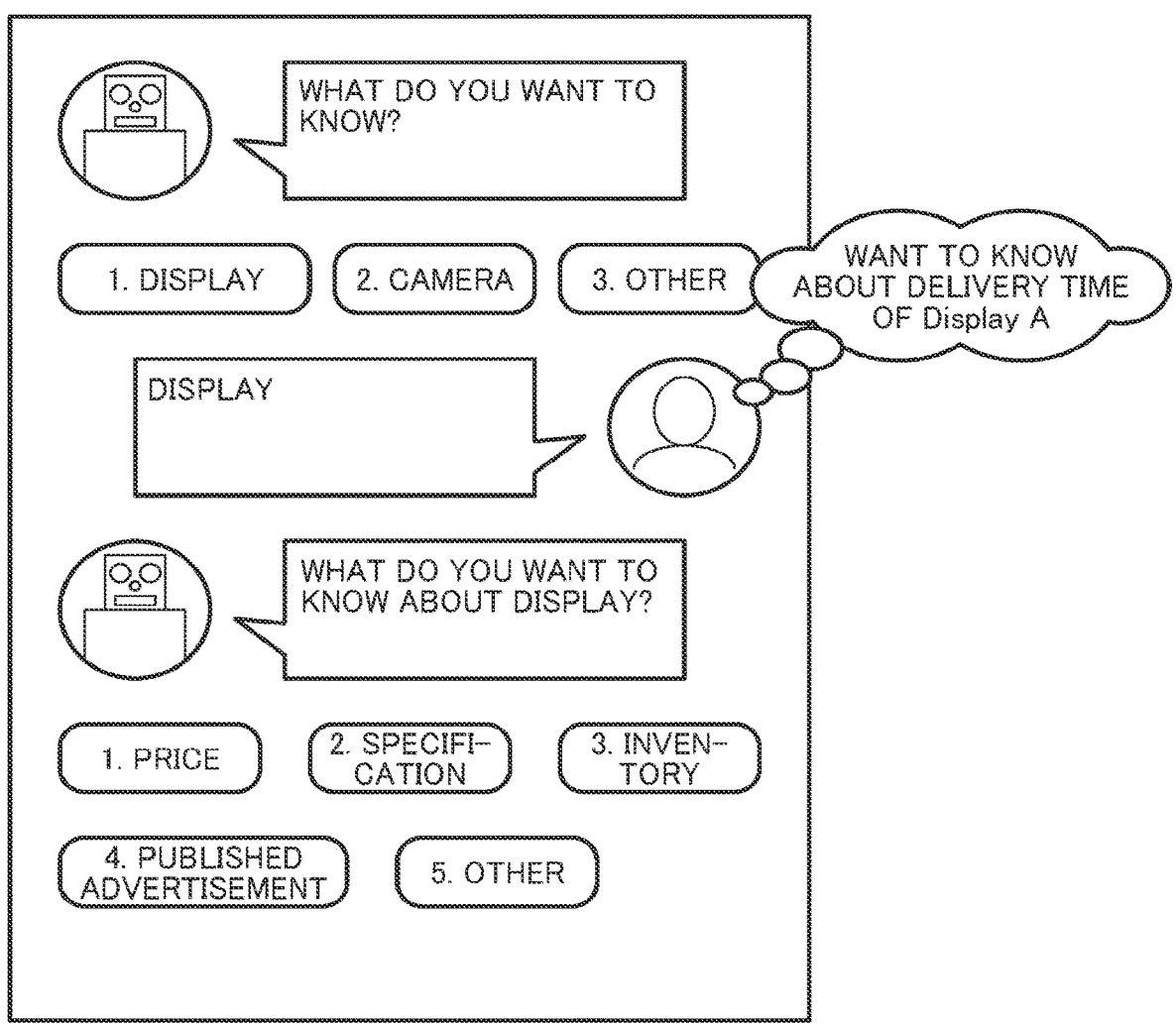
FIGS. 12A and 12B are views illustrating screen examples of the terminal that inquires the question in a dialogue format, according to another embodiment of the present disclosure.
Figure 12B:
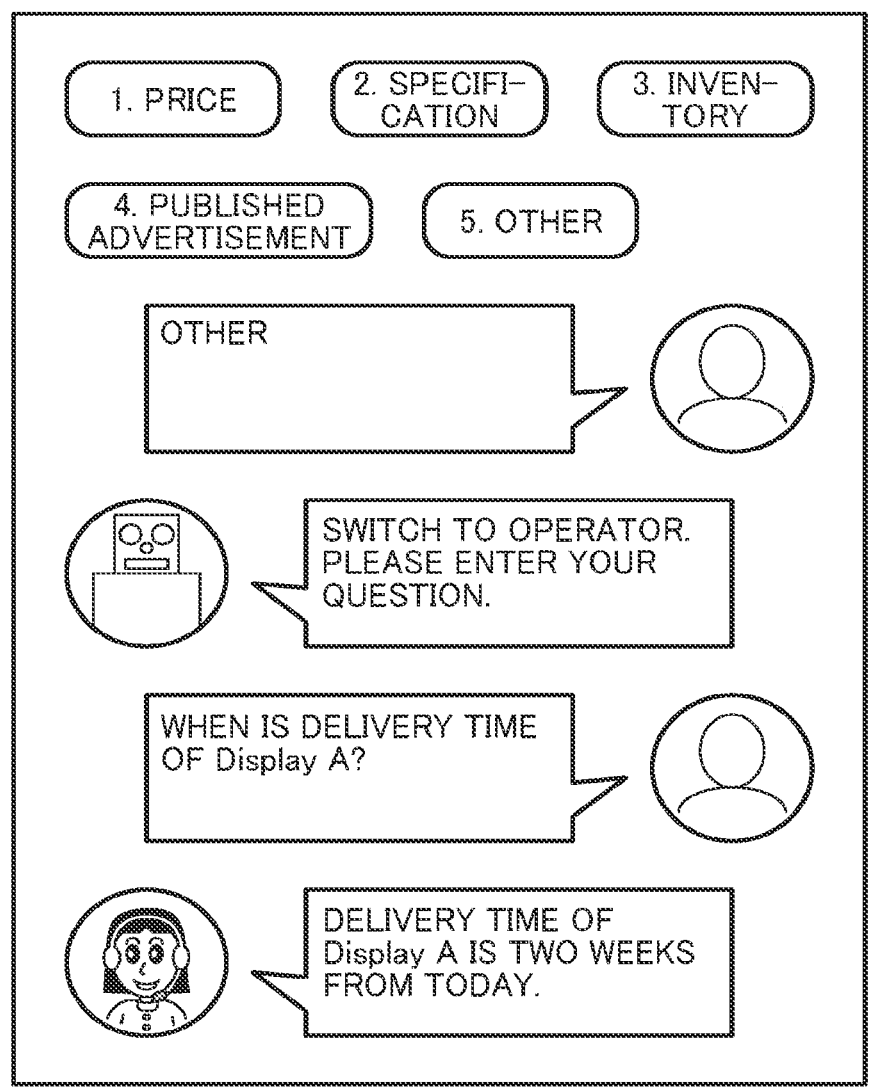

The description has been made so far on the present embodiment while presenting the specific examples with reference to FIGS. 7A and 7B to FIGS. 11A, 11B, and 11C. In each of the above-described examples, the description has been made on the case where the answer source is selected for the question that is input by the user using the natural sentence. However, such examples merely constitute an embodiment. The information processing apparatus 110 may accept the question in another format. As an example of the format for accepting the question by a method other than the input of the natural sentence, the question may be accepted in a dialogue format in which the user and the bot make conversation in a chat. FIGS. 12A and 12B are views illustrating screen examples of the terminal 120 that inquires the question in the dialogue format in another embodiment. In FIGS. 12A and 12B, it is assumed that the user thinks "WANT TO KNOW ABOUT DELIVERY TIME OF Display A".

In the example of the dialogue format illustrated in FIGS. 12A and 12B, instead of the questions using the natural sentences, the user selects information that he/she wants to know from options presented by the answer source selector 330. In this way, the database serving as the answer source is specified. For example, as illustrated in FIG. 12A, the answer source selector 330 notifies the terminal 120 of "WHAT DO YOU WANT TO KNOW?", and presents to the user with options including "1. DISPLAY", "2. CAMERA", and "3. OTHER", and the like. Then, the user selects the information he/she wants to know from the presented options. Here, the user may select the option by inputting "DISPLAY" or by inputting "1" that is a number corresponding to "DISPLAY". Alternatively, the user may input the option by tapping one of the options displayed on the screen or clicking one of the options with a mouse.

When being notified that the user selects "DISPLAY", the answer source selector 330 further presents options related to "DISPLAY" and prompts the user to make selection. In the example illustrated in FIG. 12A, the answer source selector 330 displays "WHAT DO YOU WANT TO KNOW ABOUT DISPLAY?", and then presents options including "1. PRICE", "2. SPECIFICATION", and the like. Here, each of the options is associated with corresponding one of the various FAQ databases. In this way, the answer source selector 330 can easily identify the database serving as the answer source. For example, the option of "PRICE" is associated with the accounting department FAQ database, and the option of "SPECIFICATION" is associated with the sales department FAQ database. As a result, based on the option selected by the user, the answer source selector 330 can appropriately select the FAQ database serving as the answer source.

In the example illustrated in FIG. 12A, none of the presented options is related to the "DELIVERY TIME" that the user wants to know. Thus, as illustrated in FIG. 12B, the user inputs the option of "OTHER". As a result, in the case where the option of "OTHER" is not associated with any of the FAQ databases, the answer source selector 330 determines that the answering by the person-to-person correspondence is more appropriate for the user's question than the answering by the bot, and thus switches to the answering by the operator. Then, the operator who is in charge of the person-to-person correspondence accepts the user's question and provides the answer. In this way, the user can obtain the desired answer. Alternatively, the input of the natural sentence may be accepted in the middle of the dialogue format.

As described above, even in the case where the question is accepted in the dialogue format, the answer source can appropriately be selected. Therefore, the user can easily obtain the appropriate answer, and the burden on the operator can be alleviated.

In addition, as in the dialogue format illustrated in FIGS. 12A and 12B, in the case where the options are presented to the user and the user selects the information he/she wants to know from the options to obtain the answer, the options have to be repeatedly branched to specify the content of the question. Thus, the information processing apparatus 110 in another preferred embodiment is configured to include the dialogue scenario setting unit 380. When a dialogue scenario in which the options and the answers are associated with each other (hereinafter referred to as the dialogue scenario) is set, the database serving as the answer source is easily specified. FIGS. 13A and 13B are a view illustrating an example of a screen on which the dialogue scenario is set in the other embodiment.

The dialogue scenario setting unit 380 displays, as an example, the screen as illustrated in FIGS. 13A and 13B to the administrator. The administrator or the like operates the screen, to make settings to present a greeting sentence at a start of the chat between the bot and user and the options for narrowing down the question.

In the example illustrated in FIG. 13, along with a sentence "HOW SHOULD I SEARCH?", options including "SEARCH FROM ALL CONTENTS", "SEARCH BY CATEGORY", "SEE FREQUENTLY ASKED QUESTIONS", and the like are displayed to the user. Then, such display is set that the user is further urged to select an item related to the option selected by the user. For example, in the case where the user selects "SEARCH BY CATEGORY", the categories are presented as the options, and the user is further urged to select from the options. In the case where the user selects "SEE FREQUENTLY ASKED QUESTIONS", the questions that are frequently asked are presented to the user, and the user is further urged to select from the questions.

Figure 14A:
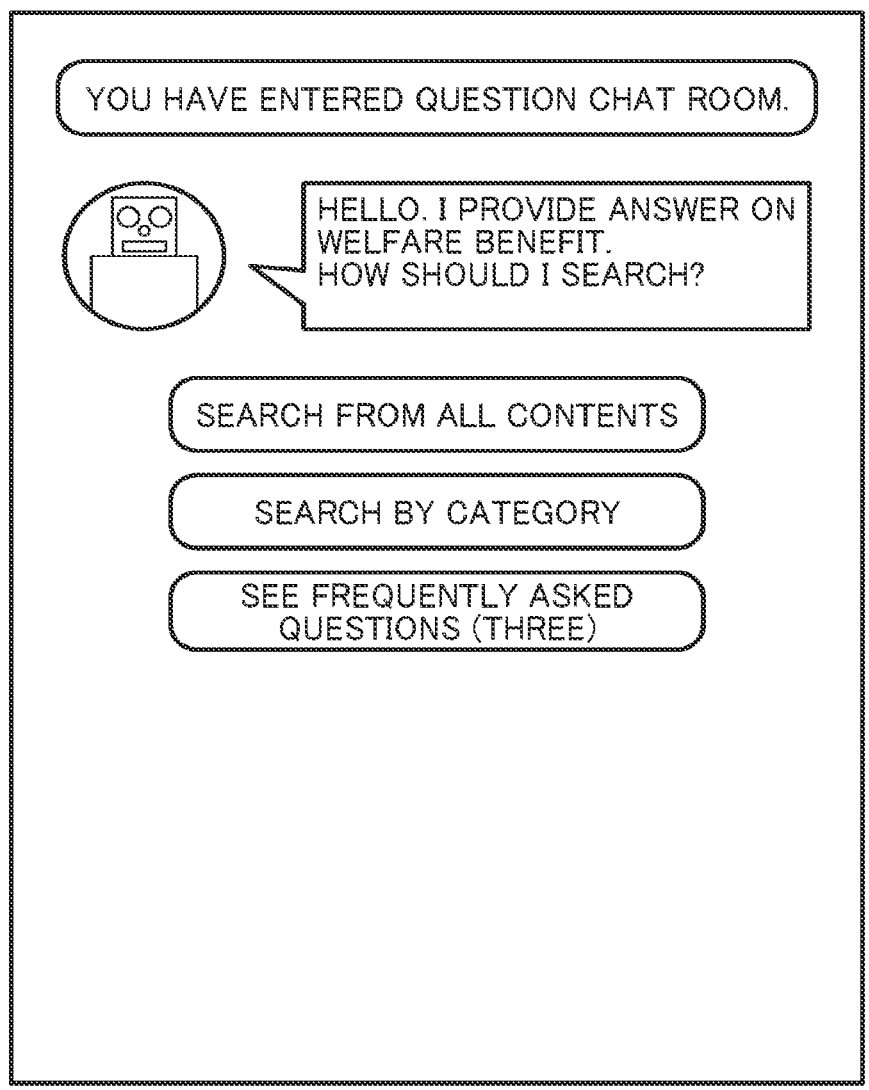
FIGS. 14A, 14B, and 14C are views illustrating screen examples of the terminal that inquires the question based on the dialogue scenario, according to an embodiment of the present disclosure.
Figure 14B:
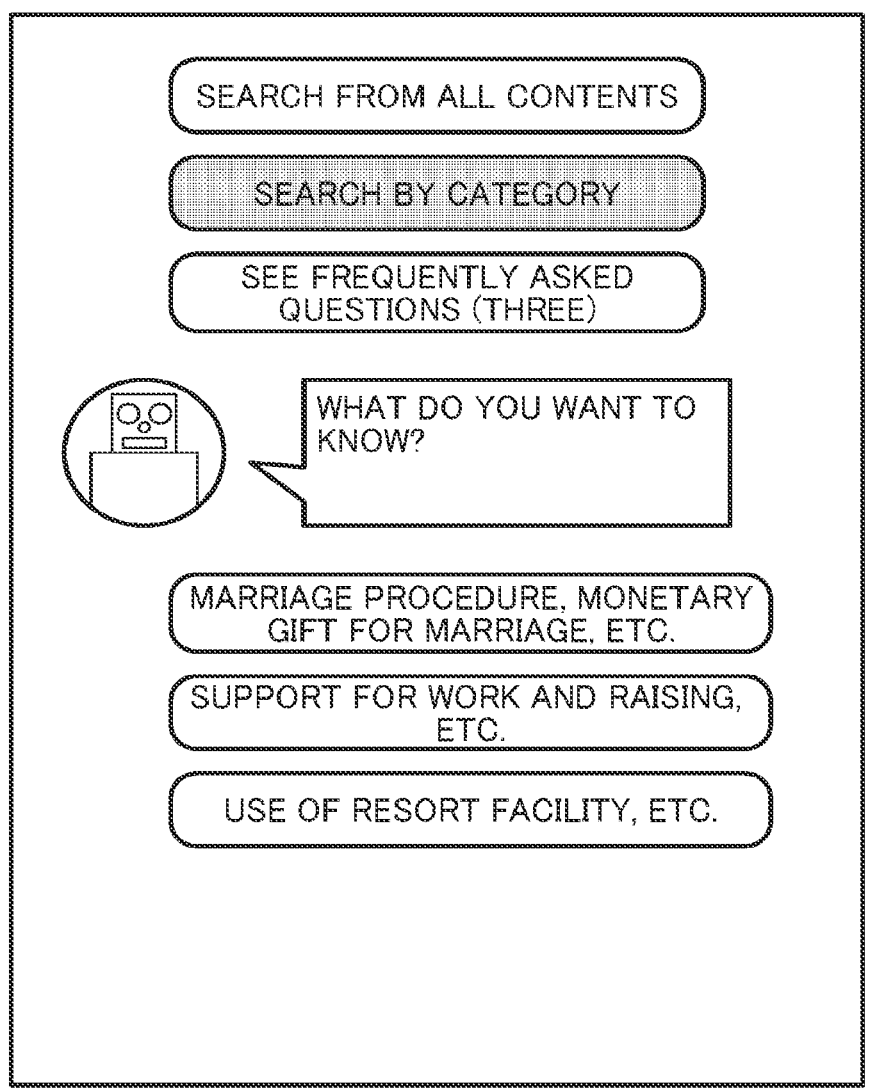
Figure 14C:
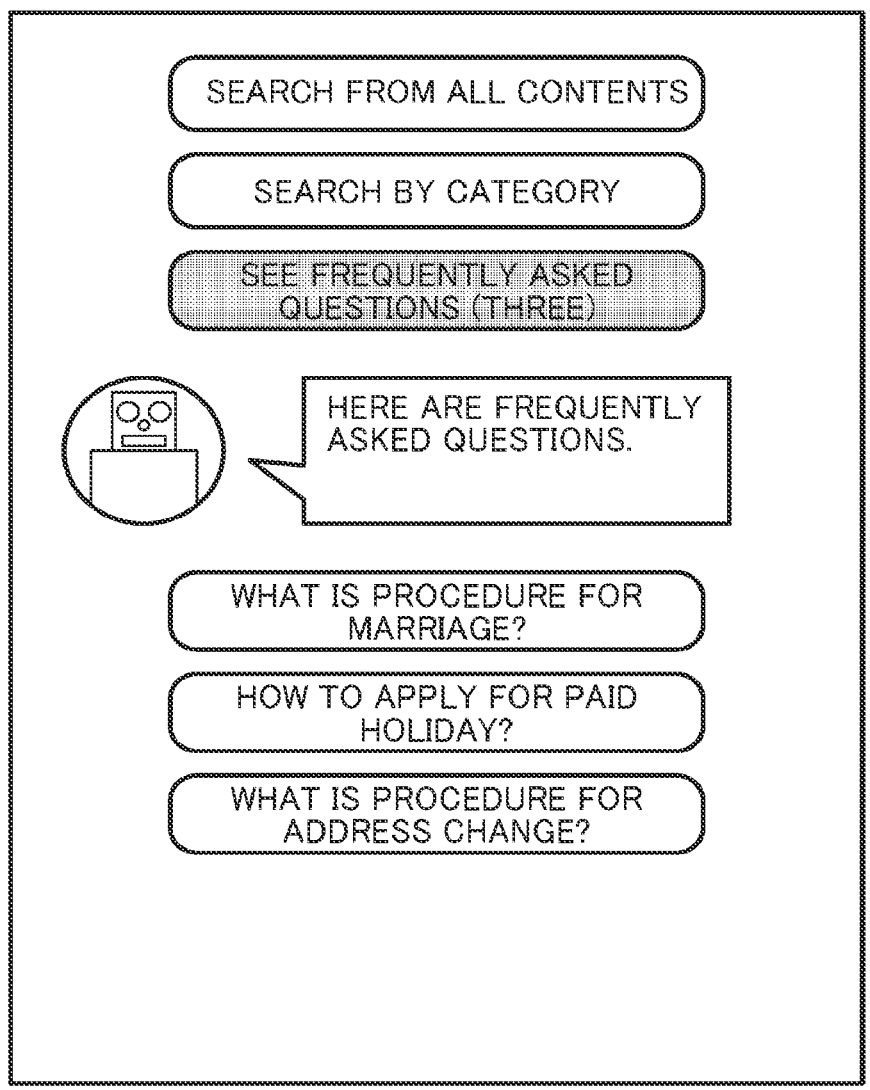

As described above, the next option is further presented in accordance with the option selected by the user, and such a process is repeated. In this way, the user can easily obtain the desired answer. In the case where the desired answer is not obtained by presenting the options, the answering may be switched to the input of the natural sentence or to the answering by the operator. In this way, the user can easily obtain the desired answer. FIGS. 14A, 14B, and 14C are views illustrating screen examples of the terminal 120 that inquires the question based on the dialogue scenario in the other embodiment.

In the case where the dialogue scenario is set as illustrated in FIG. 13, the screen as illustrated in FIG. 14A is displayed first. Here, in the case where the user selects "SEARCH BY CATEGORY", the screen for selecting the category as illustrated in FIG. 14B is displayed. Then, the user selects the option related to the information he/she wants to know. As a result, the FAQ database serving as the answer source can be narrowed. Such a process is repeated to specify the information the user wants to know.

In the case where the user selects "SEE FREQUENTLY ASKED QUESTIONS" on the screen illustrated in FIG. 14A, the questions that are frequently asked as illustrated in FIG. 14C are displayed. In this way, the user can directly inquire about the information he/she wants to know.

In a further preferred embodiment, the above-described dialogue format and the input of the natural sentence may be combined to accept the input of the question.

In the related art, the question not available in the FAQ database is not appropriately answered. Thus, convenience for the user is insufficient. For such a reason, a technique of further improving the accuracy of answer to user's question is requested.

According to the embodiments of the present disclosure that have been described so far, it is possible to provide the information processing apparatus, the system, the method, and the program for selecting the appropriate answer source for the answer based on the information the user wants to know.

Each of the functions in the above-described embodiments of the present disclosure can be implemented by a device executable program written in any one of C, C++, C#, Java (registered trademark), and the like. The program in the present embodiment can be stored and distributed in any one of device readable non-transitory storage mediums that include a hard disk drive, a compact disc read-only memory (CD-ROM), a magneto-optical drive (MO), a digital versatile disc (DVD), a flexible disk, an electrically erasable programmable read-only memory (EEPROM), an erasable programmable read-only memory (EPROM), and the like. In addition, the program in the present embodiment can be transmitted in a format, which allows another device, to use via a network.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An information processing apparatus, comprising:
   processing circuitry configured to:
      receive an inquiry from a user;
      determine whether a content of the inquiry satisfies a condition for providing a response corresponding to the inquiry;
      in a case that the processing circuitry determines that the content satisfies the condition, refer to information stored in a database, to generate the response;
      in a case that the processing circuitry determines that the content does not satisfy the condition, perform control to switch to responding to the inquiry by an operator;
      provide, to the user, the response along with options as to whether the response is a desired answer; and
      in a case that the user indicates that the response is not the desired answer, switch the inquiry to the operator.

2. The information processing apparatus according to claim 1, further comprising:
   a memory that stores the database, wherein
   the database includes a plurality of information having at least a first field in which a word related to inquiry information is stored and a second field in which answer information is stored.

3. The information processing apparatus according to claim 2, wherein the processing circuitry generates the response by searching the database for a first field corresponding to words in the content of the inquiry and retrieving information in a corresponding second field as content of the response.

4. The information processing apparatus according to claim 1, wherein the processing circuitry determines that the content does not satisfy the condition in a case that the content is not found in the database.

5. The information processing apparatus according to claim 1, wherein the processing circuitry is further configured to perform a morphological analysis on the content.

6. The information processing apparatus according to claim 1, wherein the processing circuitry determines that the content does not satisfy the condition in a case that the processing circuitry is unable to perform a morphological analysis on the content.

7. The information processing apparatus according to claim 1, wherein the processing circuitry is further configured to:
   authenticate the user; and
   generate the response based on authentication of the user.

8. The information processing apparatus according to claim 1, wherein the processing circuitry is configured to, in a case that the user indicates that the response is not the desired answer, generate a new response to the inquiry by again referring to the information stored in the database.

9. The information processing apparatus according to claim 1, wherein the processing circuitry is further configured to:
   learn the content of the inquiry and corresponding response information from the database based on a result of selecting particular information from the database; and
   generate the response based on the learned content.

10. The information processing apparatus according to claim 1, the processing circuitry is configured to present the response to the user in a dialogue format.

11. A method, comprising:
    receiving an inquiry from a user;
    determining whether a content of the inquiry satisfies a condition for providing a response corresponding to the inquiry; referring, in a case that the determining indicates that the content satisfies the condition, to information stored in a database to generate the response;
    performing, in a case that the determining indicates that the content does not satisfy the condition, control to switch to responding to the inquiry by an operator;
    providing, to the user, the response along with options as to whether the response is a desired answer; and
    switching, in a case that the user indicates that the response is not the desired answer, the inquiry to the operator.

12. The method according to claim 11, wherein the database includes a plurality of information having at least a first field in which a word related to inquiry information is stored and a second field in which answer information is stored.

13. The method according to claim 12, wherein the referring to the information stored in the database includes searching the database for a first field corresponding to words in the content of the inquiry and retrieving information in a corresponding second field as content of the response.

14. The method according to claim 11, further comprising determining that the content does not satisfy the condition in a case that the content is not found in the database.

15. The method according to claim 11, further comprising performing a morphological analysis on the content.

16. An information processing system, comprising:
    a terminal; and
    an information processing apparatus including processing circuitry configured to:
       receive, from the terminal, an inquiry from a user;
       determine whether a content of the inquiry satisfies a condition for providing a response corresponding to the inquiry;
       in a case that the processing circuitry determines that the content satisfies the condition, refer to information stored in a database, to generate the response;
       in a case that the processing circuitry determines that the content does not satisfy the condition, perform control to switch to responding to the inquiry by an operator;
       provide, to the user, the response along with options as to whether the response is a desired answer; and
       in a case that the user indicates that the response is not the desired answer, switch the inquiry to the operator.

17. A non-transitory computer readable medium storing computer executable instructions which, when executed by processing circuitry of an apparatus, cause the apparatus to:
    receive an inquiry from a user;

determine whether a content of the inquiry satisfies a condition for providing a response corresponding to the inquiry;
in a case that the processing circuitry determines that the content satisfies the condition, refer to information stored in a database, to generate the response;
in a case that the processing circuitry determines that the content does not satisfy the condition, perform control to switch to responding to the inquiry by an operator;
provide, to the user, the response along with options as to whether the response is a desired answer; and
in a case that the user indicates that the response is not the desired answer, switch the inquiry to the operator.

* * * * *